US012694580B2

(12) United States Patent
Sadalgi et al.

(10) Patent No.: US 12,694,580 B2
(45) Date of Patent: Jul. 28, 2026

(54) GENERATIVE AI TECHNIQUES FOR ADAPTING STYLE OF A SPACE

(71) Applicant: Wayfair LLC, Boston, MA (US)

(72) Inventors: Shrenik Sadalgi, Cambridge, MA (US); Nicole Allison Tan, Brookline, MA (US); Abhijit Gurjal, Cambridge, MA (US); Rachana Sreedhar, Boston, MA (US)

(73) Assignee: Wayfair LLC, Boston, MA (US)

( * ) Notice: Subject to any disclaimer, the term of this patent is extended or adjusted under 35 U.S.C. 154(b) by 91 days.

(21) Appl. No.: 18/753,428

(22) Filed: Jun. 25, 2024

(65) Prior Publication Data

US 2025/0005810 A1      Jan. 2, 2025

Related U.S. Application Data

(60) Provisional application No. 63/523,533, filed on Jun. 27, 2023.

(51) Int. Cl.
*G06T 11/00* (2026.01)
*G06F 3/0485* (2022.01)
*G06F 16/535* (2019.01)

(52) U.S. Cl.
CPC ............ *G06T 11/00* (2013.01); *G06F 3/0485* (2013.01); *G06F 16/535* (2019.01); *G06T 2210/04* (2013.01); *G06T 2211/441* (2023.08)

(58) Field of Classification Search
CPC .................. G06T 11/00; G06T 2210/04; G06T 2211/441; G06F 3/0485; G06F 16/535; G06F 16/583
See application file for complete search history.

(56) References Cited

U.S. PATENT DOCUMENTS

| | | | | |
|---|---|---|---|---|
| 11,790,558 | B1 * | 10/2023 | Balakrishnan ......... | G06N 20/00 |
| | | | | 382/154 |
| 2021/0225043 | A1 * | 7/2021 | Tang ...................... | G06F 18/21 |
| 2024/0135514 | A1 * | 4/2024 | Pakhomov ............... | G06T 7/11 |
| 2024/0161462 | A1 * | 5/2024 | Gandelsman ............. | G06T 5/60 |
| 2024/0346629 | A1 * | 10/2024 | Harikumar ........... | G06F 40/279 |

(Continued)

OTHER PUBLICATIONS

Extended European Search Report for Application No. 24184278.0, mailed Jan. 21, 2025.

(Continued)

*Primary Examiner* — Jitesh Patel

(74) *Attorney, Agent, or Firm* — Wolf, Greenfield & Sacks, P.C.

(57)      ABSTRACT

Techniques for generating one or more images of a space in one or more target styles using a generative machine learning model is described. Furnishing products similar to furnishings detected in the generated images are identified in a catalog of furnishing products and information about the identified furnishing products is provided to a user via a user interface. Also describes are techniques for generating modified images of a space using a generative machine learning model. Furnishing products similar to alternative furnishings in modified image are identified in the catalog of furnishing products and information about the identified furnishing products is provided to a user via a user interface.

22 Claims, 40 Drawing Sheets

(56) References Cited

U.S. PATENT DOCUMENTS

2024/0378801 A1 * 11/2024 Rivas Vetencourt ... G06F 21/16
2024/0420205 A1 * 12/2024 Unnikrishnan .... G06Q 30/0625

OTHER PUBLICATIONS

No Author Listed, Use Google Lens to Find Furniture on the Go. Tablebases.com. Feb. 24, 2023. 5 pages. Retrieved from the Internet: https:tablebases.com/blog/use-google-lens-to-findfurniture-on-the-go (Last accessed: Feb. 21, 2025).

* cited by examiner

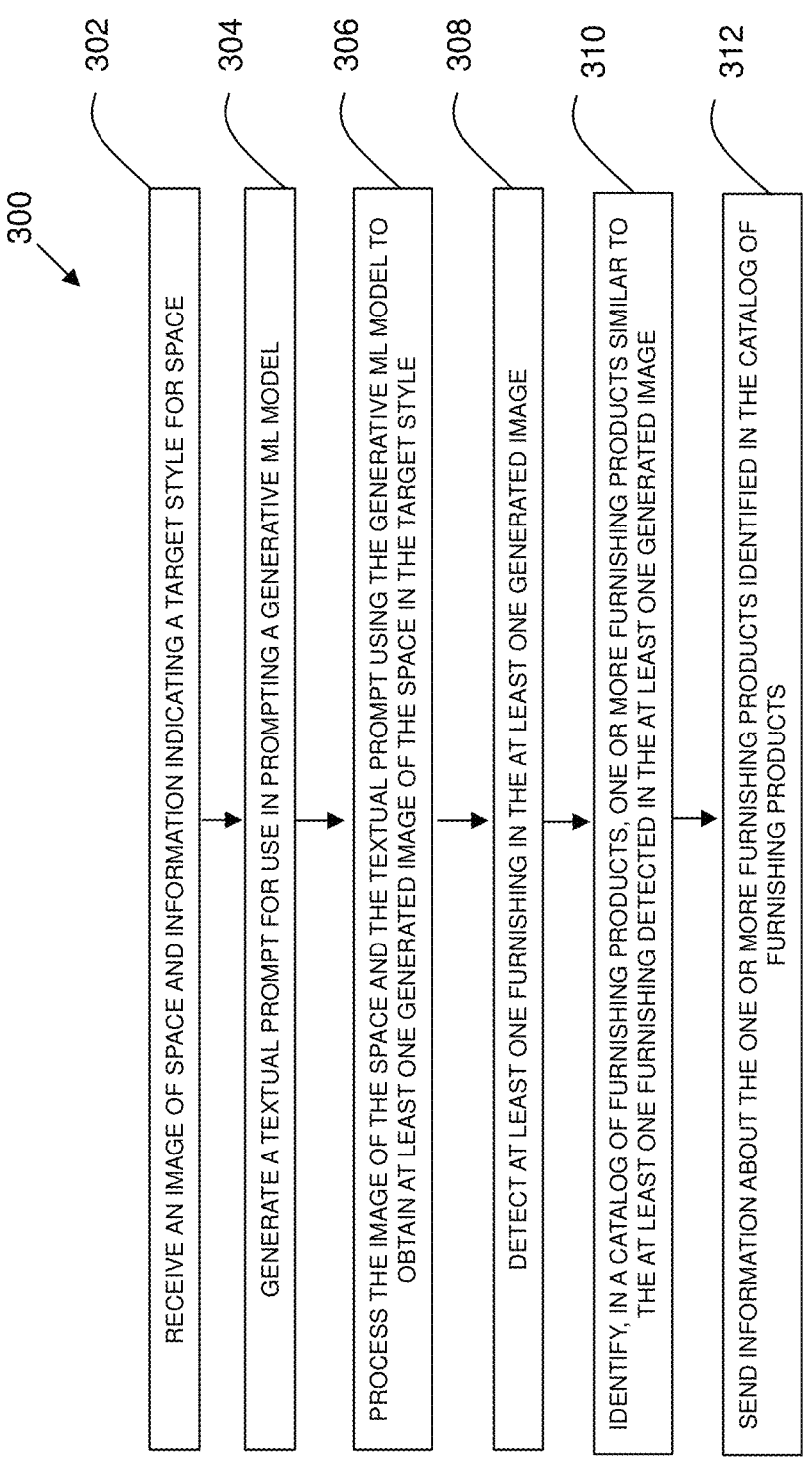

300

302 RECEIVE AN IMAGE OF SPACE AND INFORMATION INDICATING A TARGET STYLE FOR SPACE

304 GENERATE A TEXTUAL PROMPT FOR USE IN PROMPTING A GENERATIVE ML MODEL

306 PROCESS THE IMAGE OF THE SPACE AND THE TEXTUAL PROMPT USING THE GENERATIVE ML MODEL TO OBTAIN AT LEAST ONE GENERATED IMAGE OF THE SPACE IN THE TARGET STYLE

308 DETECT AT LEAST ONE FURNISHING IN THE AT LEAST ONE GENERATED IMAGE

310 IDENTIFY, IN A CATALOG OF FURNISHING PRODUCTS, ONE OR MORE FURNISHING PRODUCTS SIMILAR TO THE AT LEAST ONE FURNISHING DETECTED IN THE AT LEAST ONE GENERATED IMAGE

312 SEND INFORMATION ABOUT THE ONE OR MORE FURNISHING PRODUCTS IDENTIFIED IN THE CATALOG OF FURNISHING PRODUCTS

FIG. 3A

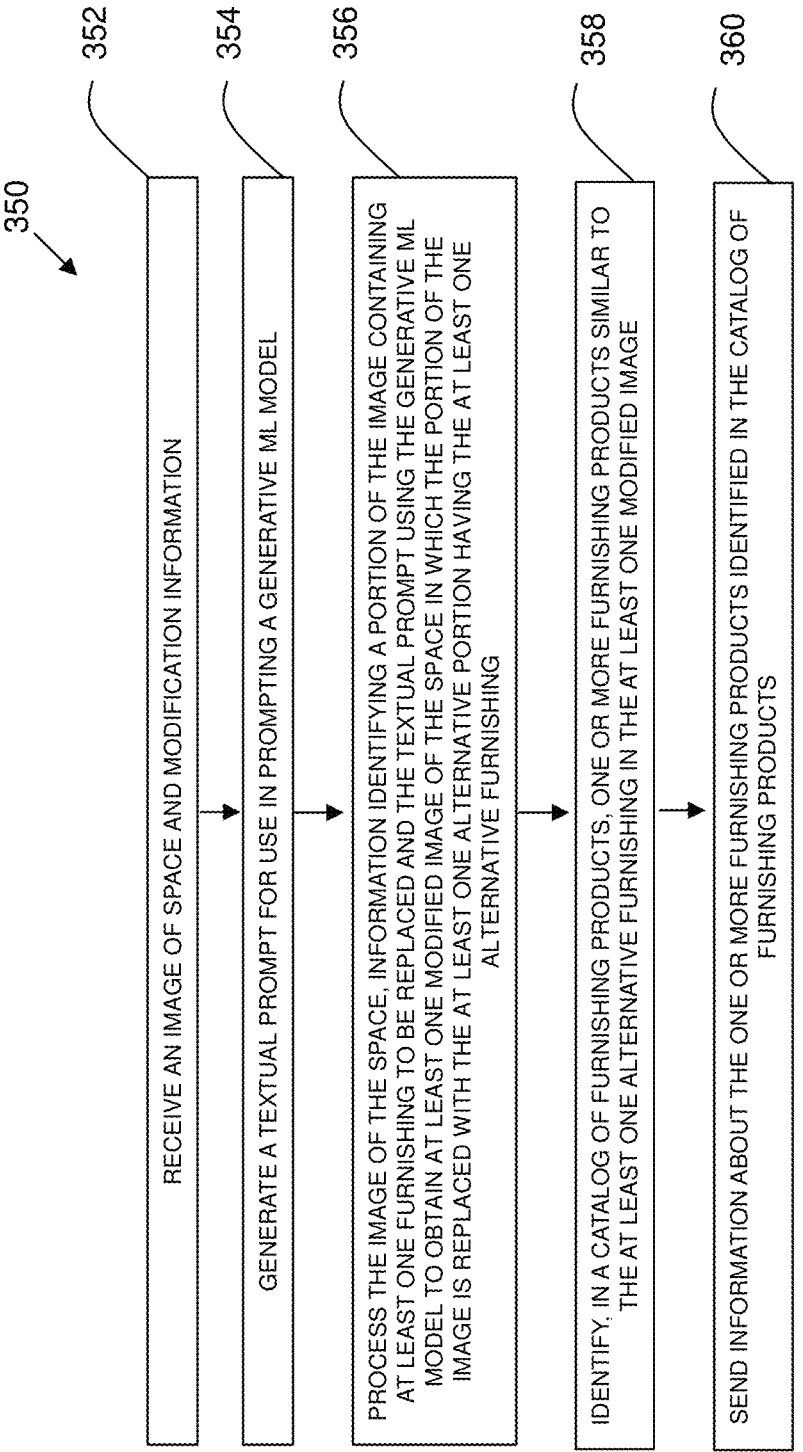

350

352 — RECEIVE AN IMAGE OF SPACE AND MODIFICATION INFORMATION

354 — GENERATE A TEXTUAL PROMPT FOR USE IN PROMPTING A GENERATIVE ML MODEL

356 — PROCESS THE IMAGE OF THE SPACE, INFORMATION IDENTIFYING A PORTION OF THE IMAGE CONTAINING AT LEAST ONE FURNISHING TO BE REPLACED AND THE TEXTUAL PROMPT USING THE GENERATIVE ML MODEL TO OBTAIN AT LEAST ONE MODIFIED IMAGE OF THE SPACE IN WHICH THE PORTION OF THE IMAGE IS REPLACED WITH THE AT LEAST ONE ALTERNATIVE PORTION HAVING THE AT LEAST ONE ALTERNATIVE FURNISHING

358 — IDENTIFY, IN A CATALOG OF FURNISHING PRODUCTS, ONE OR MORE FURNISHING PRODUCTS SIMILAR TO THE AT LEAST ONE ALTERNATIVE FURNISHING IN THE AT LEAST ONE MODIFIED IMAGE

360 — SEND INFORMATION ABOUT THE ONE OR MORE FURNISHING PRODUCTS IDENTIFIED IN THE CATALOG OF FURNISHING PRODUCTS

Figure 4B:
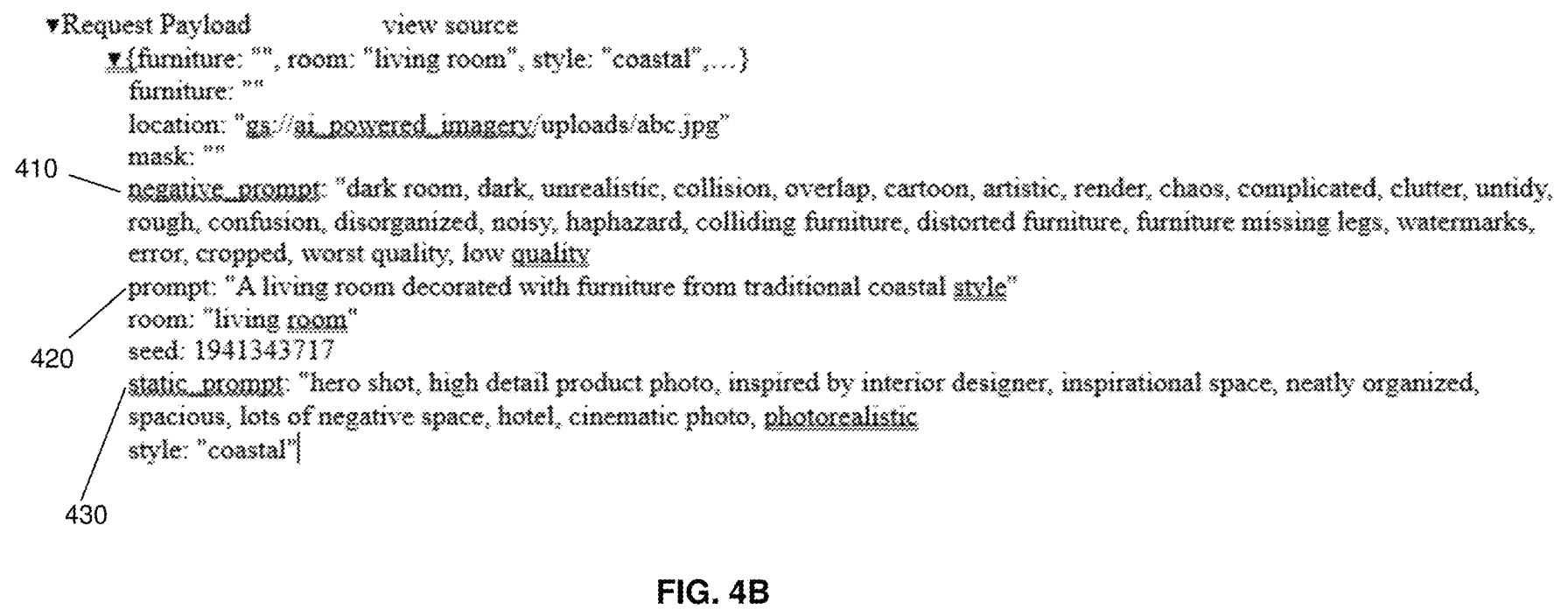

▼Request Payload          view source
▼{furniture: "", room: "living room", style: "coastal", ...}
  furniture: ""
  location: "gs://ai_powered_imagery/uploads/abc.jpg"
  mask: ""
  negative_prompt: "dark room, dark, unrealistic, collision, overlap, cartoon, artistic, render, chaos, complicated, clutter, untidy, rough, confusion, disorganized, noisy, haphazard, colliding furniture, distorted furniture, furniture missing legs, watermarks, error, cropped, worst quality, low quality"
  prompt: "A living room decorated with furniture from traditional coastal style"
  room: "living room"
  seed: 1941343717
  static_prompt: "hero shot, high detail product photo, inspired by interior designer, inspirational space, neatly organized, spacious, lots of negative space, hotel, cinematic photo, photorealistic"
  style: "coastal"]

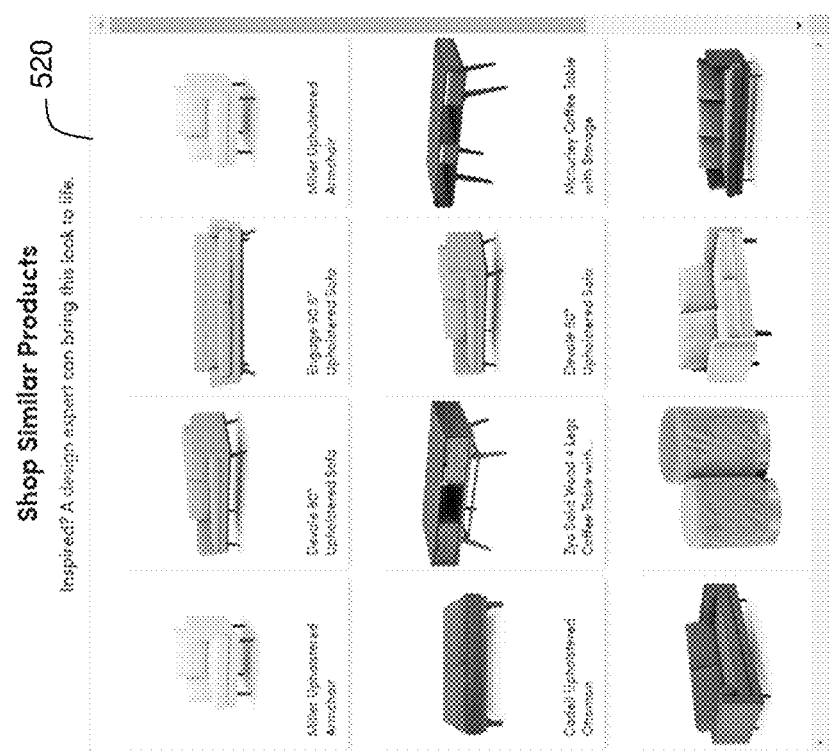
FIG. 5A

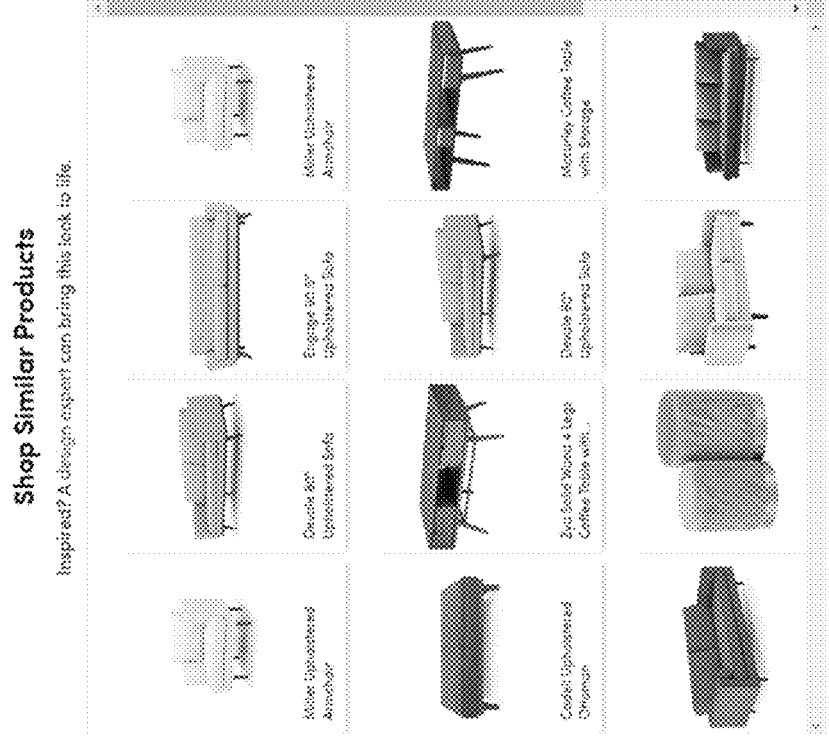
FIG. 5B

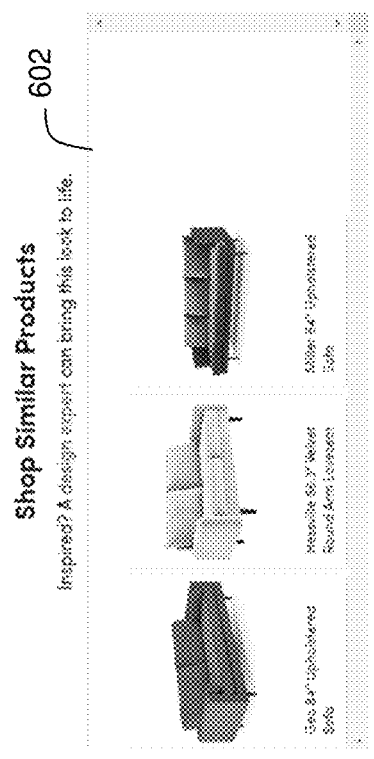
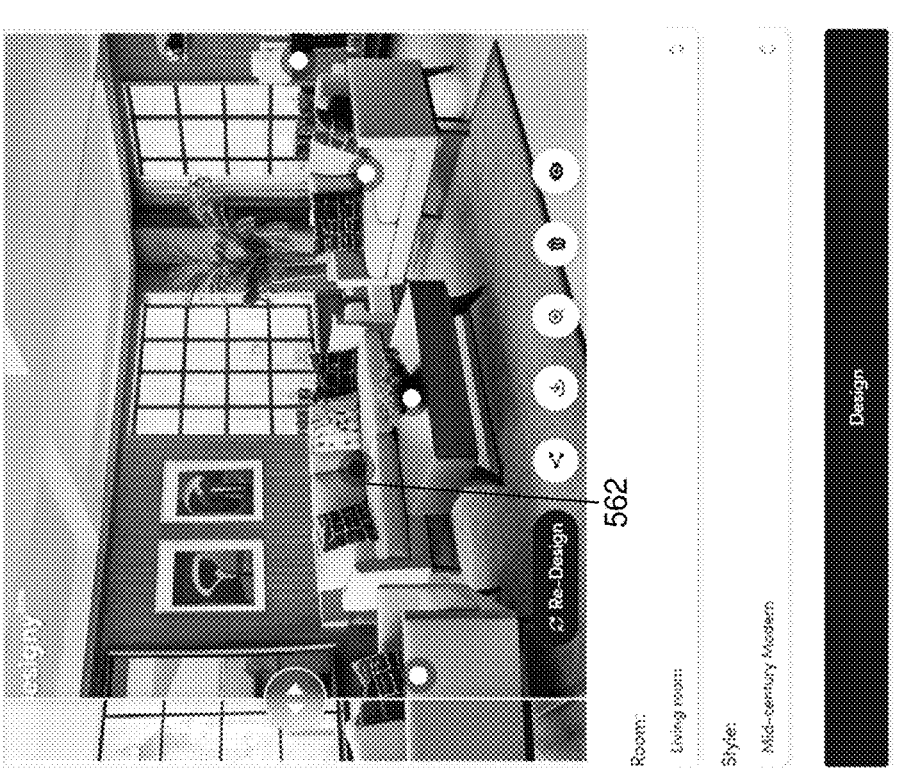
FIG. 6A

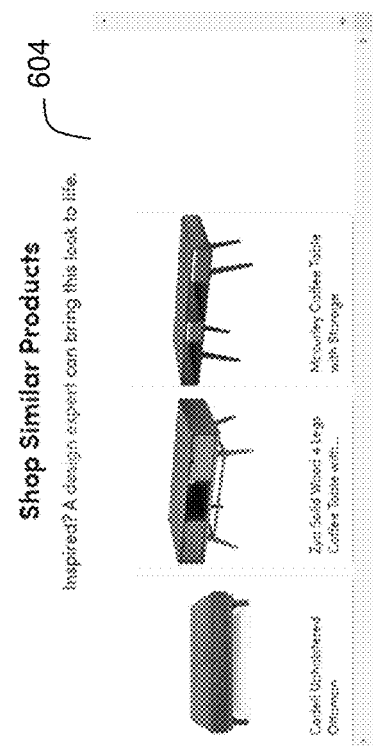
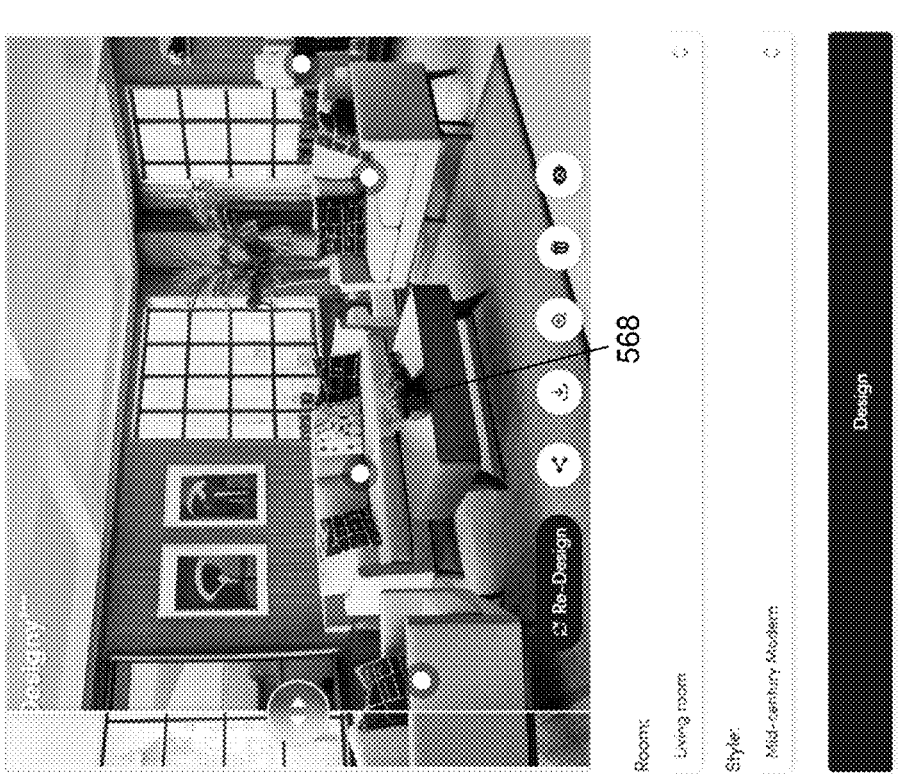
FIG. 6B

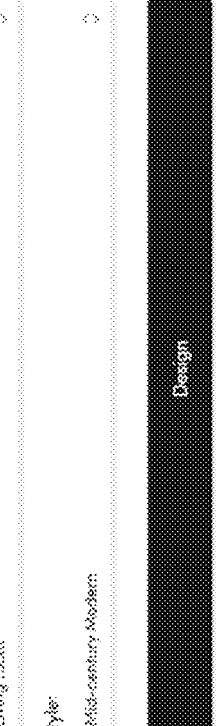
FIG. 7

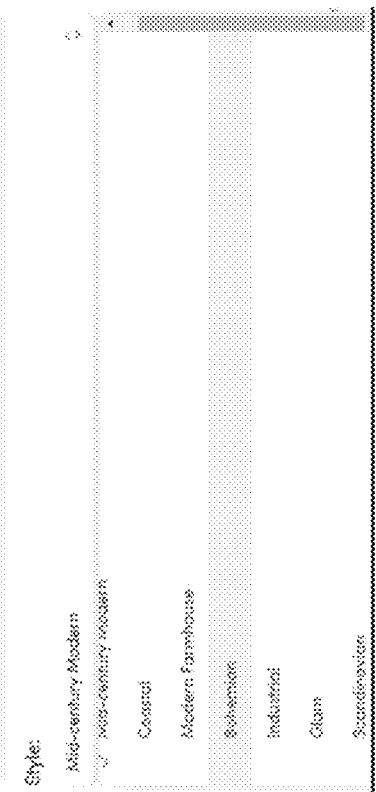
FIG. 8A

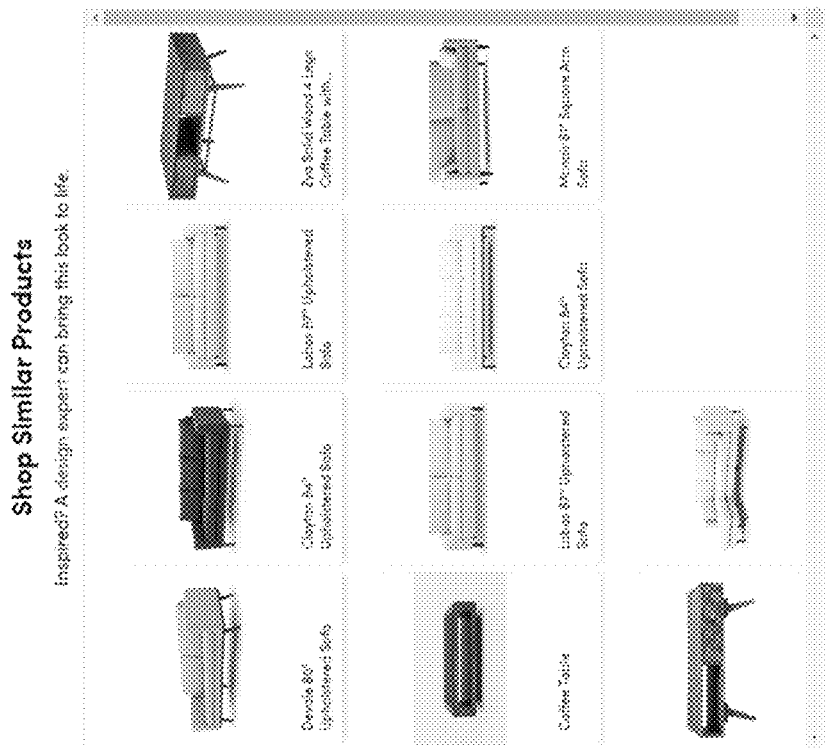
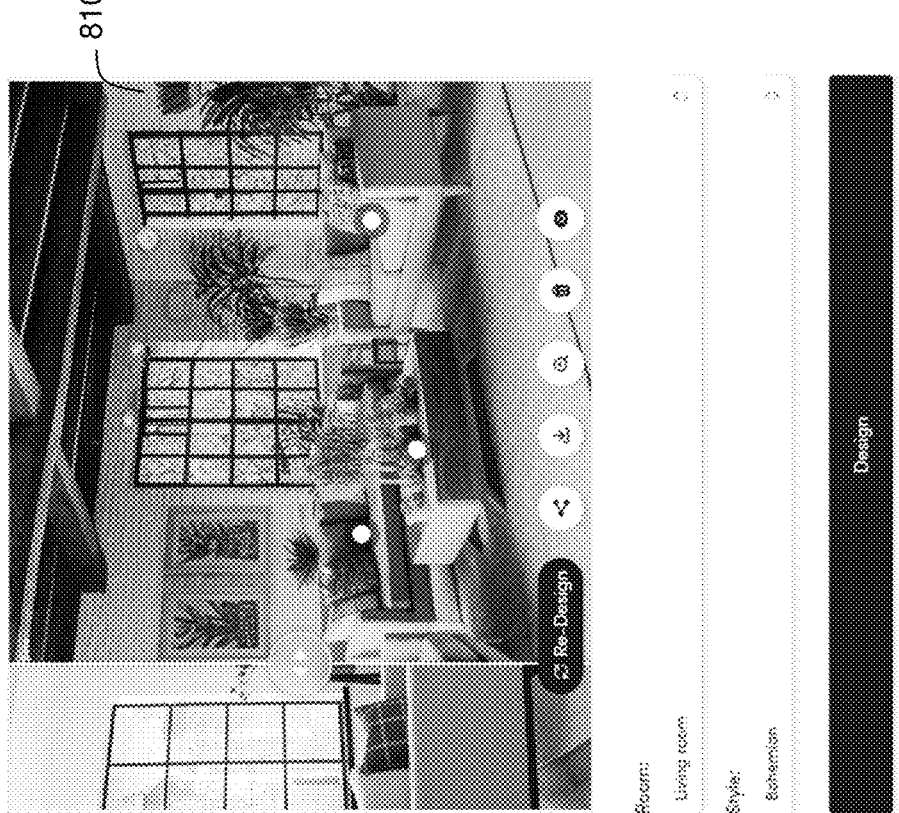
FIG. 8B

FIG. 9
My Designs
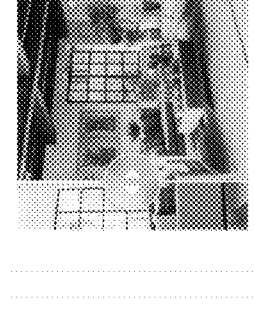
living room / bohemian
Tue Jun 20 2023
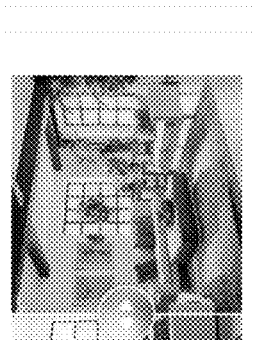
living room / bohemian
Tue Jun 20 2023
living room / mid-century modern
Tue Jun 20 2023
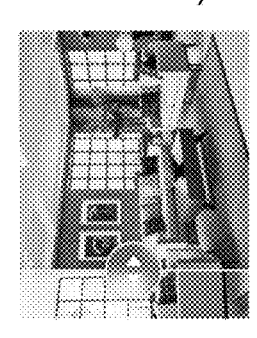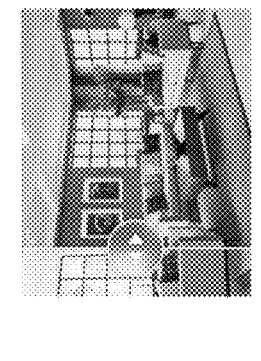
living room / mid-century modern
Tue Jun 20 2023
904
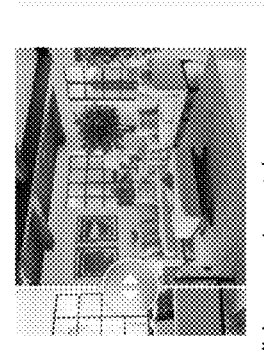
living room / coastal
Tue Jun 20 2023
902
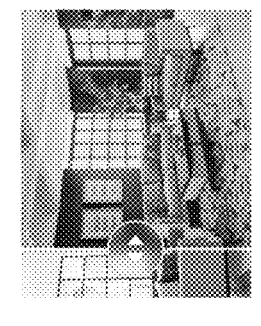
living room / mid-century modern
Tue Jun 20 2023

Figure 11:
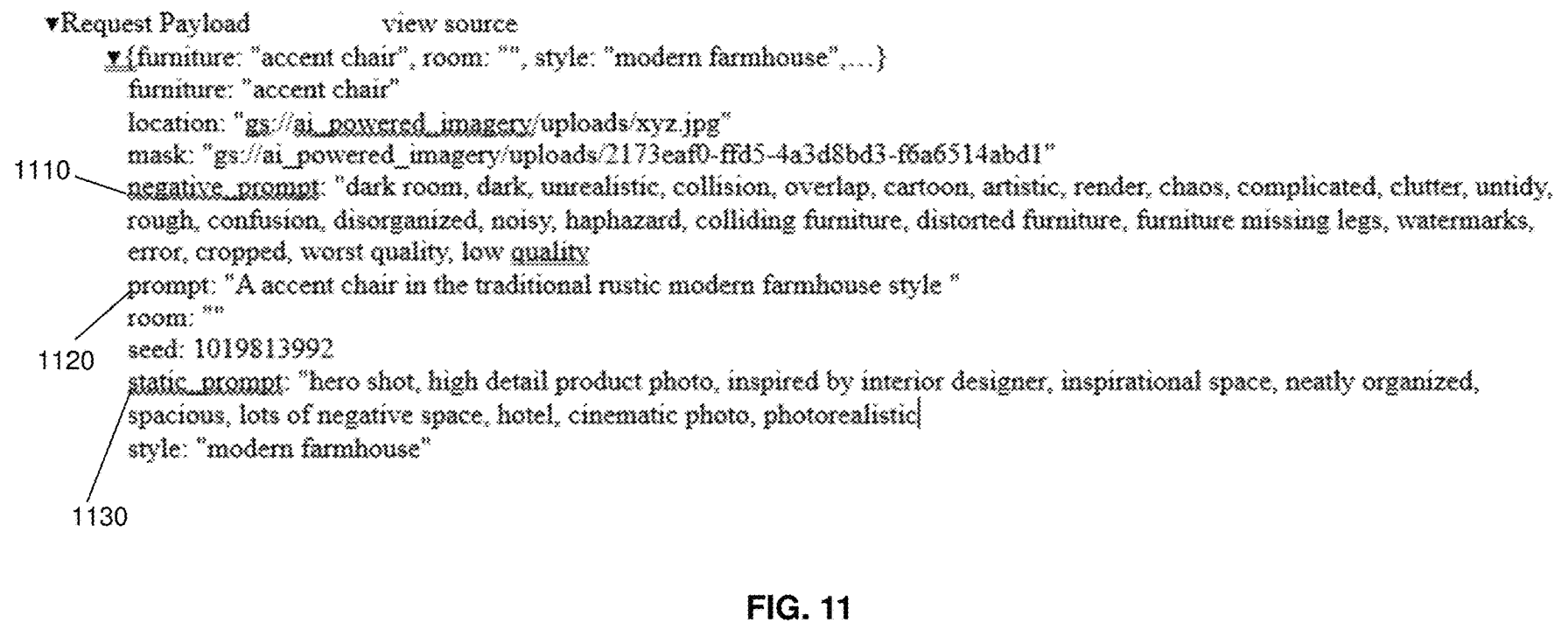

▼Request Payload        view source

▼{furniture: "accent chair", room: "", style: "modern farmhouse" ,....} furniture: "accent chair"

location: "gs://ai_powered_imagery/uploads/xyz.jpg"

mask: "gs://ai_powered_imagery/uploads/2173eaf0-ffd5-4a3d8bd3-f6a6514abd1"

negative_prompt: "dark room, dark, unrealistic, collision, overlap, cartoon, artistic, render, chaos, complicated, clutter, untidy, rough, confusion, disorganized, noisy, haphazard, colliding furniture, distorted furniture, furniture missing legs, watermarks, error, cropped, worst quality, low quality prompt: "A accent chair in the traditional rustic modern farmhouse style "

room: ""

seed: 1019813992 static_prompt: "hero shot, high detail product photo, inspired by interior designer, inspirational space, neatly organized, spacious, lots of negative space, hotel, cinematic photo, photorealistic style: "modern farmhouse"

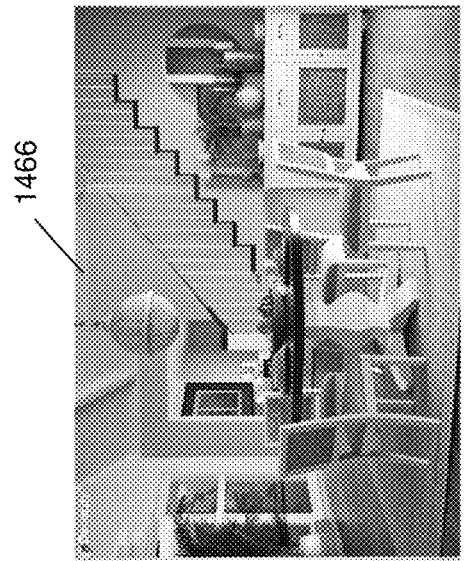
1466
Coastal
1472
Glam
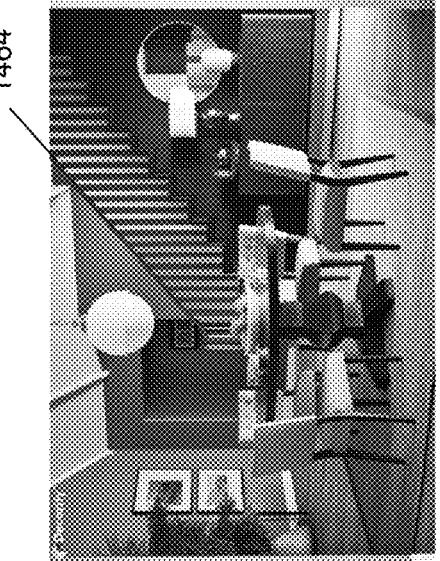
1464
Mid-Century Modern
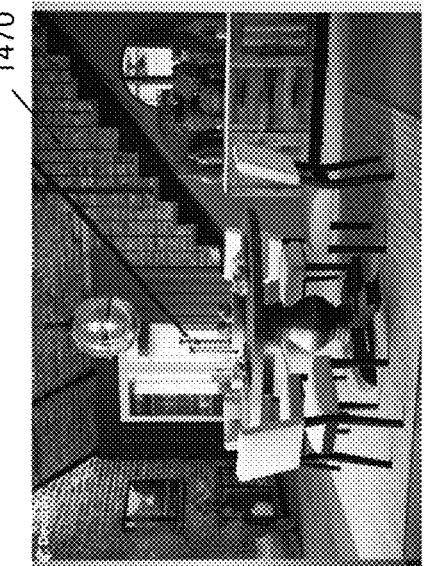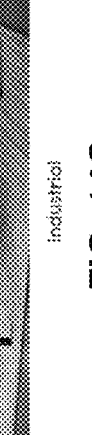
1470
Industrial
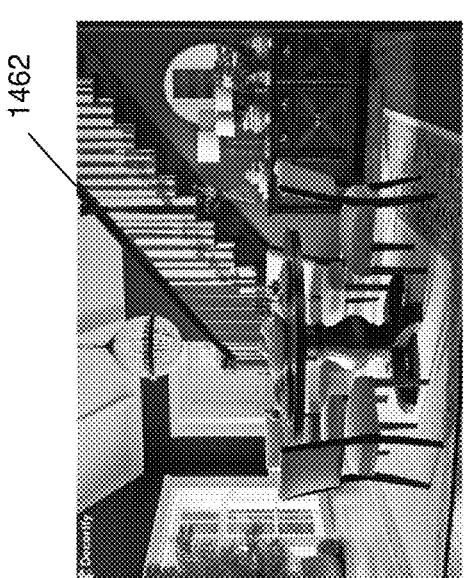
1462
Traditional
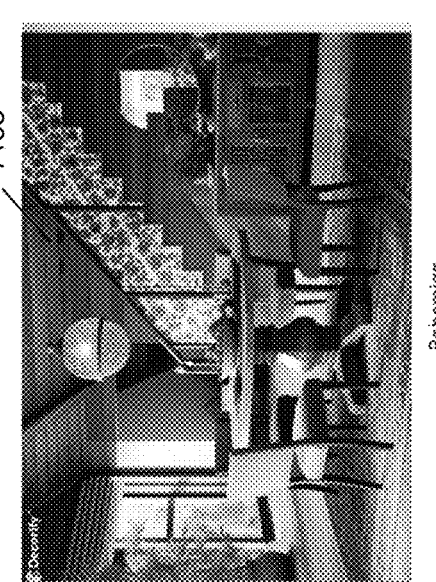
1468
Bohemian
FIG. 14C

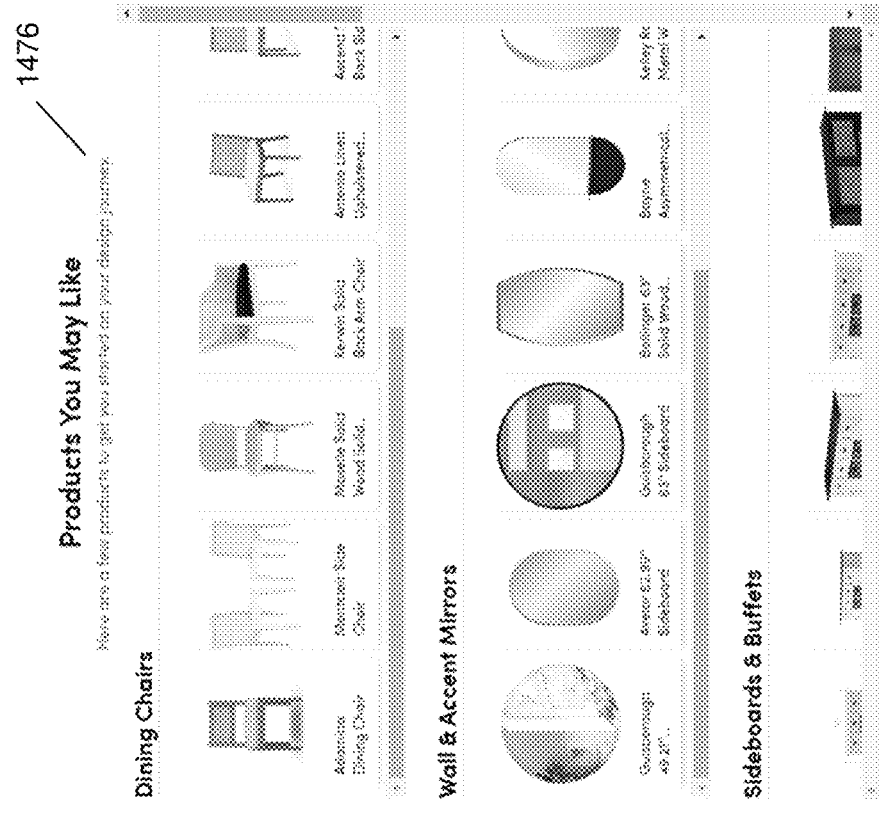
FIG. 14D

1476
1494
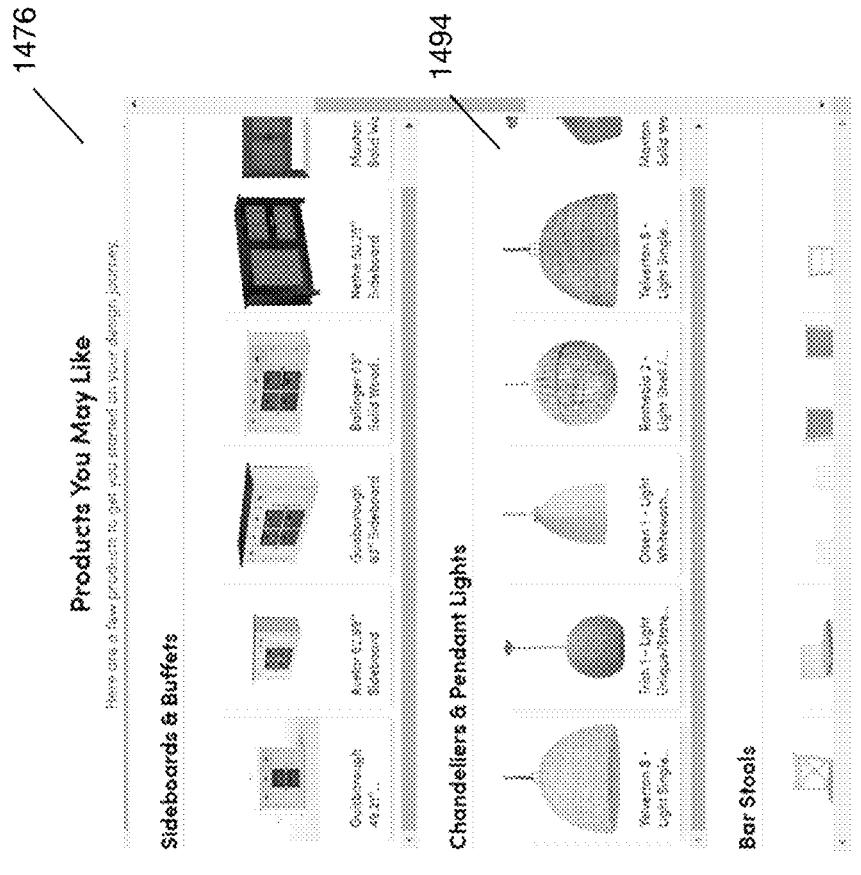
1492
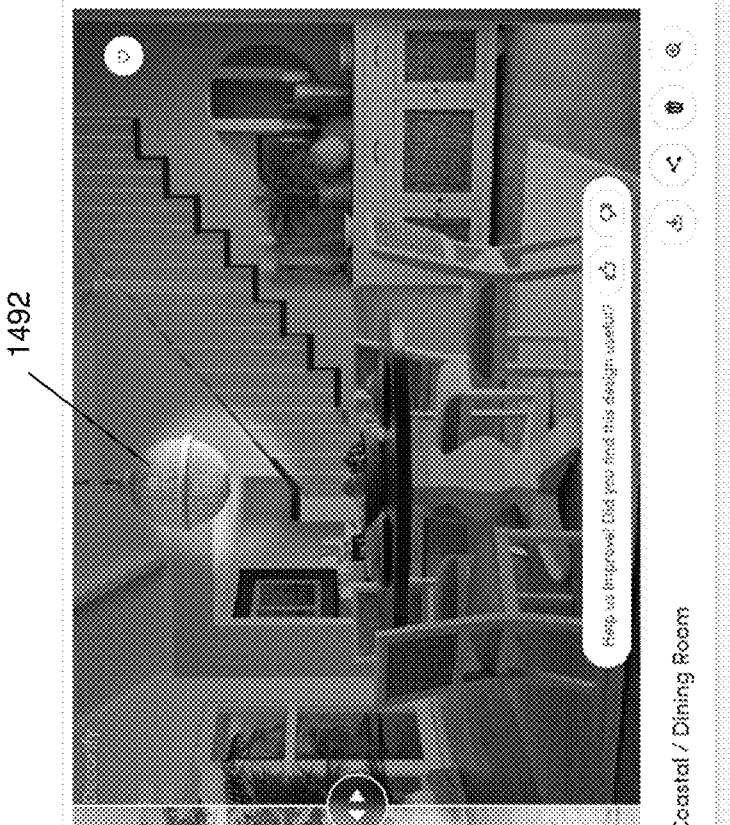
FIG. 14F

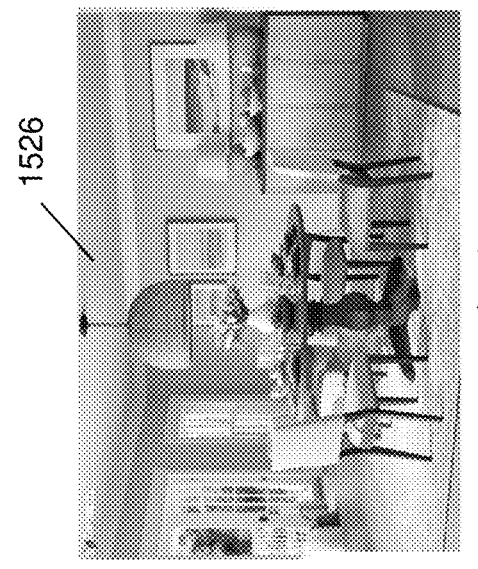
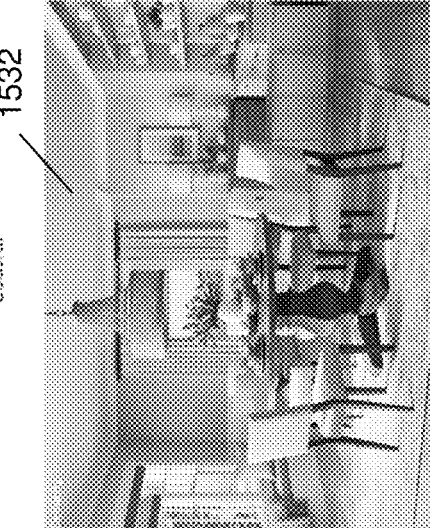
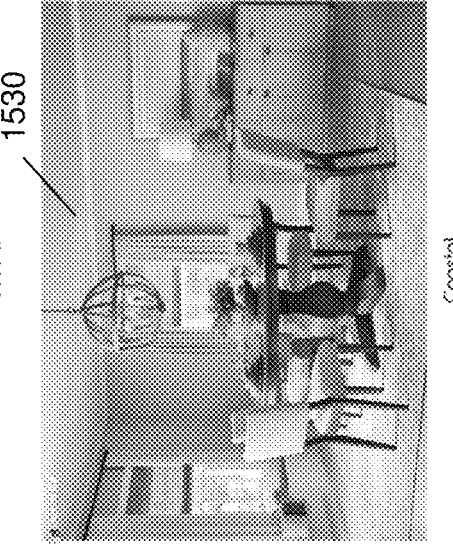
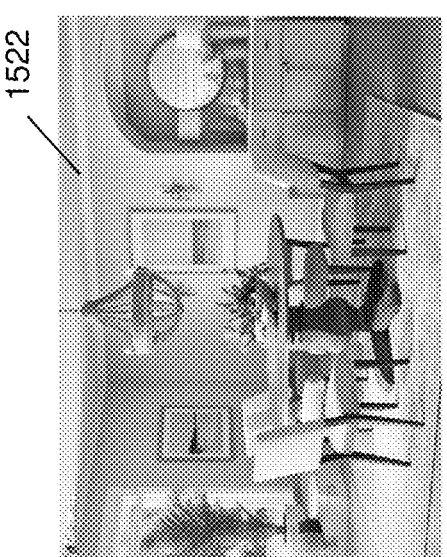
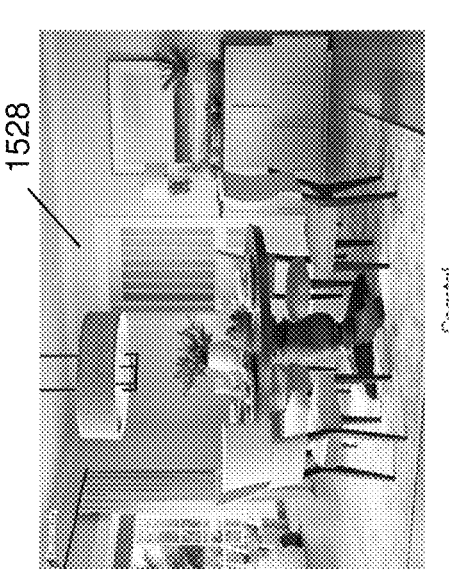
FIG. 15B

GENERATIVE AI TECHNIQUES FOR ADAPTING STYLE OF A SPACE

CROSS REFERENCE TO RELATED APPLICATIONS

This application claims the benefit of priority under 35 U.S.C. § 119(e) to U.S. Provisional Patent Application Ser. No. 63/523,533, filed on Jun. 27, 2023, entitled "GENERATIVE AI TECHNIQUES FOR ADAPTING STYLE OF A SPACE," which is hereby incorporated by reference in its entirety.

BACKGROUND

Online retailers primarily sell products (e.g., furnishings, appliances, toys, etc.) through a web-based computer interface. Customers may access the web-based interface using an Internet browser or dedicated computer software program (e.g., an "app" on a smartphone) to browse among products on sale, search for products of interest, purchase products, and have the products delivered to their homes.

Online retailers typically offer a wider range of products than brick-and-mortar retailers. For example, an online retailer may offer millions of different products, while the products offered by the brick-and-mortar retailer may number in the hundreds or low thousands.

SUMMARY

Some embodiments provide for a method for using a generative machine learning (ML) model to generate one or more images of a space in one or more target styles. The method comprises using at least one computer hardware processor to perform: receiving, from a client device, an image of the space, and information indicating a target style for the space; generating, from the information indicating the target style for the space, a textual prompt for use in prompting the generative ML model to generate one or more images of the space in the target style; processing the image of the space and the textual prompt by using the generative ML model to obtain at least one generated image of the space in the target style; detecting at least one furnishing in the at least one generated image; identifying, in a catalog of furnishing products, one or more furnishing products similar to the at least one furnishing detected in the at least one generated image, the identifying comprising: obtaining at least one portion of the at least one generated image containing the detected at least one furnishing; and searching, using the at least one portion and among a set of images of furnishing products in the catalog, for one or more images of furnishing products similar to the detected at least one furnishing; and sending, to the client device, information about the one or more furnishing products identified in the catalog of furnishing products.

Some embodiments provide for a method for using a generative machine learning (ML) model to modify an image of a space. The method comprises using at least one computer hardware processor to perform: receiving, from a client device, an image of the space and modification information, the modification information indicating: a portion of the image containing at least one furnishing to be replaced with an alternative portion having at least one alternative furnishing, at least one furnishing type for the at least one alternative furnishing, and a target style for the at least one alternative furnishing; generating, using the modification information, a textual prompt for use in prompting the generative ML model to generate at least one modified image of the space in which the portion of the image is replaced with at least one alternative portion; processing the image of the space, information identifying the portion of the image, and the textual prompt by using the generative ML model to obtain at least one modified image of the space in which the portion of the image is replaced with the at least one alternative portion having the at least one alternative furnishing; and identifying, in a catalog of furnishing products, one or more furnishing products similar to the at least one alternative furnishing in the at least one modified image, the identifying comprising: searching, using the at least one alternative portion and among a set of images of furnishing products in the catalog, for one or more images of furnishing products similar to the at least one alternative furnishing; and sending, to the client device, information about the one or more furnishing products identified in the catalog of furnishing products.

Some embodiments provide for a method for identifying furnishing products in a catalog of furnishing products. The method comprises using at least one computer hardware processor to perform: detecting at least one furnishing in at least one generated image of a space in a target style, wherein the at least one generated image of the space in the target style is generated by processing an original image of the space using a generative ML model; identifying, in a catalog of furnishing products, one or more furnishing products similar to the at least one furnishing detected in the at least one generated image, the identifying comprising: obtaining at least one portion of the at least one generated image containing the detected at least one furnishing; and searching, using the at least one portion and among a set of images of furnishing products in the catalog, for one or more images of furnishing products similar to the detected at least one furnishing; and sending, to a client device, information about the one or more furnishing products identified in the catalog of furnishing products.

BRIEF DESCRIPTION OF DRAWINGS

Various aspects and embodiments will be described herein with reference to the following figures. It should be appreciated that the figures are not necessarily drawn to scale. Items appearing in multiple figures are indicated by the same or similar reference number in all the figures in which they appear.

FIG. 3A is a flowchart of an example process 300 for using a generative machine learning (ML) model to generate one or more images of a space in one or more target styles, according to some embodiments of the technology described herein.

FIG. 3B is a flowchart of an example process 350 for using a generative machine learning (ML) model to modify an image of a space, according to some embodiments of the technology described herein.

FIG. 4B illustrates example data provided as input to a generative ML model used for generating image(s) of the space in a target style, according to some embodiments of the technology described herein.

FIG. 5A is a screenshot of an example user interface that displays the image generated by the generative ML model and a list of furnishing products similar to furnishings detected in the generated image, according to some embodiments of the technology described herein.

FIG. 5B is a screenshot of an example user interface that allows a user to flip between a view of the original input image and the image generated by the generative ML model, according to some embodiments of the technology described herein.

FIGS. 6A-6B are screenshots of example user interfaces in which particular furnishings detected in the generated image are highlighted using selectable markers, which when selected cause a list or images of furnishing products similar to the corresponding furnishing to be displayed, according to some embodiments of the technology described herein.

FIG. 7 is a screenshot of an example user interface that displays an image generated by the using the generative ML model in a particular target style, according to some embodiments of the technology described herein.

FIGS. 8A-8B are screenshots of example user interfaces showing a different image generated by the generative ML model based on a change in the target style, according to some embodiments of the technology described herein.

FIG. 9 is a screenshot of an example user interface comprising a number of designs generated for the user, according to some embodiments of the technology described herein.

FIG. 11 illustrates example data provided as input to a generative ML model used for generating modified image(s) of the space, according to some embodiments of the technology described herein.

FIG. 14C is a screenshot of an example user interface showing multiple images of a space generated by the generative ML model in different target styles, according to some embodiments of the technology described herein.

FIGS. 14D-14F are screenshots of example user interfaces that display the image generated by the generative ML model and a list of furnishing products similar to furnishings detected in the generated image, according to some embodiments of the technology described herein.

FIG. 15B is a screenshot of an example user interface showing multiple images of a space generated by the generative ML model in different layouts for a selected target style, according to some embodiments of the technology described herein.

DETAILED DESCRIPTION

As described above, an online retailer may offer tens of thousands or even millions of products for sale. Many of the products offered by an online retailer may come in different versions (e.g., different colors, different styles, different designs, etc.). Moreover, aspects of some of the products offered by an online retailer may be customized based on user's preferences. As a result, there is a vast number of possible products available to a consumer of an online retailer, and it is challenging for consumers to identify product(s) they are seeking. In addition, consumers wanting to redesign or redecorate a space (e.g., an indoor space such as a living room, a bedroom, or a kitchen, or an outdoor space such as a patio or a porch) find it challenging to not only visualize how the redecorated space will look in a particular style (e.g., glam, industrial, contemporary, art deco, modern, etc.) but also to identify products to purchase in order to redecorate the space.

The inventors have developed a system for facilitating identification of products from an online retailer to enable users to purchase those products in order to redesign one or more spaces. The system allows consumer to upload an image of their space and use machine learning (ML) model (s) to generate an output image of the redesigned space. The output image can include furnishings, color themes (e.g., wall color, color of furnishings, etc.), arrangement of the furnishings in the space, and/or other design themes. In turn, the system (i) identifies furnishing products offered by an online retailer that are similar to furnishings shown in the output image, and (ii) apprises the consumer of the identified furnishing products that are offered by the online retailer.

Figure 2:
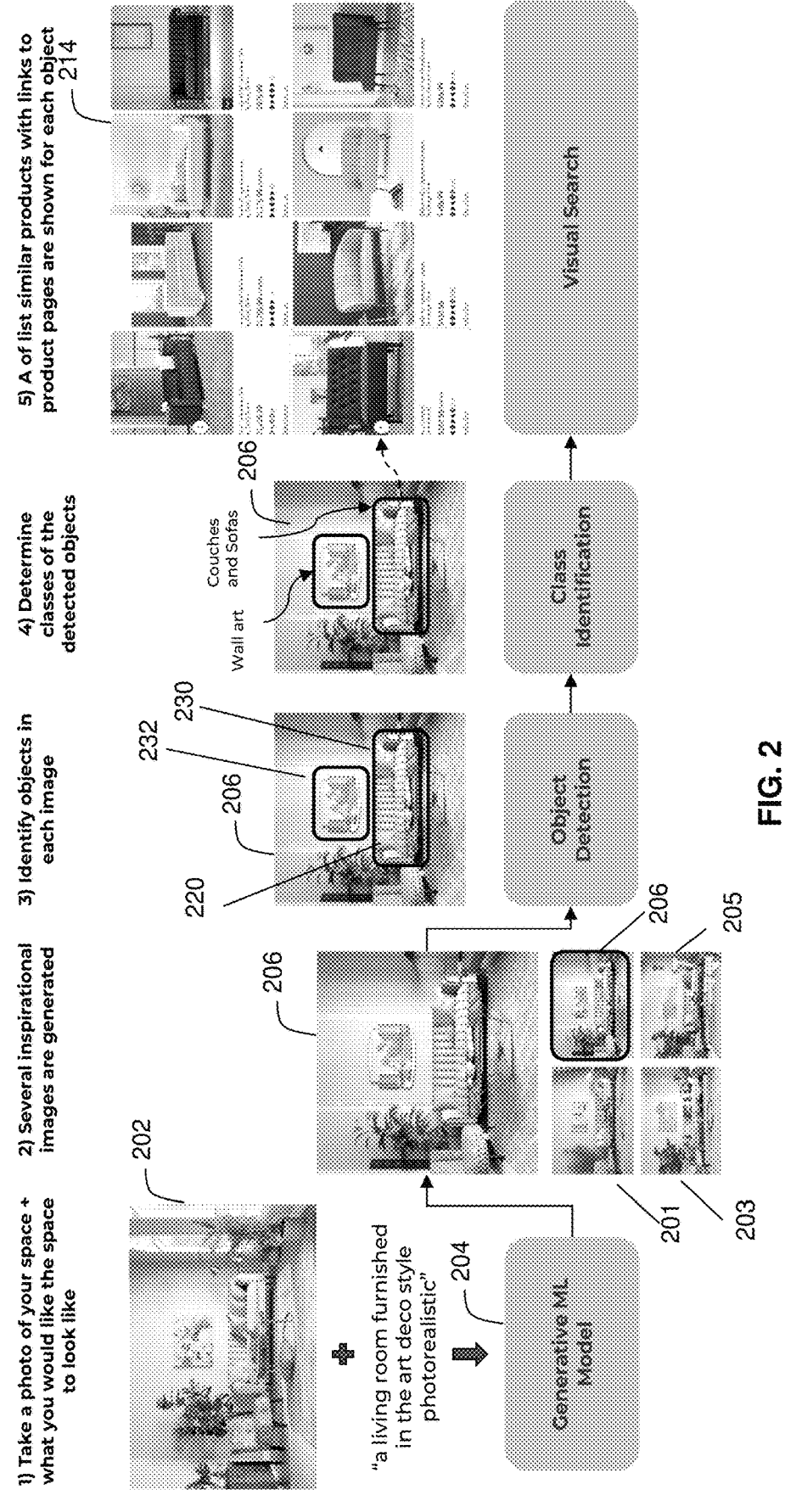
FIG. 2 illustrates a diagram of an example flow of acts performed by the system shown in FIG. 1, according to some embodiments of the technology described herein.

As a result, the system developed by the inventors helps consumers identify furnishings offered by an online retailer (or capable of being manufactured by the retailer or a manufacturer associated with the retailer) that are similar to (e.g., have certain attributes in common, are within a threshold value of a similarity measure or distance) furnishings included in output images generated using ML models (e.g., output images generated by using a generative ML model based on an image provided by the consumer). For example, as shown in FIG. 2, a redesign tool developed by the inventors may generate a list of products 214 offered by the online retailer that are similar to one or more furnishings (e.g., couch 220) included in the image 206 output by a generative ML model 204. Also, FIG. 5A shows a list of products 520 generated by the redesign tool that are similar to one or more furnishings (e.g., furnishings 502, 504, 506, 508) included in the image 510 output by a generative ML model.

Although in some embodiments, the system developed by the inventors allows an entire space to be redesigned, in other embodiments, the system facilitates redesign of a specified portion of the space. In some embodiments, the redesign tool developed by the inventors further enables consumers to specify, in an input image of the space, a portion of the space (e.g., one or more particular furnishings) that they wish to redesign (e.g., replace with one or more alternative furnishings). The redesign tool generates a modified image of the space that includes the alternative furnishing using a generative ML model, and identifies furnishing products offered by the online retailer that are similar to the alternative furnishing. For example, as shown in FIGS. 10A-10D, a consumer may indicate a piece of furniture, for example, a table 1002 to be replaced in an input image 1000 by marking a portion of the image 1020 that includes the piece of furniture and may select an alternative piece of furniture (e.g., an ottoman). The redesign tool may generate a modified image 1030 using a generative ML model that includes the ottoman and a list of products 1040 that includes product(s) that similar to the ottoman (e.g., product 1042).

Accordingly, some embodiments provide for a method for using a generative machine learning (ML) model to generate one or more images of a space (e.g., an image of a room) in one or more target styles (e.g., mid-century modern, coastal, modern farmhouse, Bohemian, industrial, glam, Scandinavian, traditional, or other target styles), the method comprising: (A) receiving, from a client device, an image of the space (e.g., an image uploaded via a graphical user interface (GUI) 400 shown in FIG. 4A), and information indicating a target style for the space (e.g., target style "Mid-century Modern" selected via a GUI element 406 of GUI 400; (B) generating, from the information indicating the target style for the space, a textual prompt (e.g., prompt 410 shown in FIG. 4B) for use in prompting the generative ML model to generate one or more images of the space in the target style; (C) processing the image of the space and the textual prompt by using the generative ML model to obtain at least one generated image of the space in the target style (e.g., image 510 in FIG. 5A); (D) detecting at least one furnishing in the at least one generated image (e.g., furnishing 502, 504, 506, 508 in image 510); (E) identifying, in a catalog of furnishing products (e.g., product catalog 150), one or more furnishing products (e.g., furnishing products 520 shown in FIG. 5A) similar to the at least one furnishing detected in the at least one generated image, the identifying comprising: obtaining at least one portion of the at least one generated image containing the detected at least one furnishing, and searching, using the at least one portion and among a set of images of furnishing products in the catalog, for one or more images of furnishing products similar to the detected at least one furnishing; and (F) sending, to the client device, information about the one or more furnishing products identified in the catalog of furnishing products.

In some embodiments, the textual prompt comprises a first textual prompt 420 including a plurality of keywords indicating image characteristics to attempt to have in the to-be-generated one or more images of the space in the target style. In some embodiments, the textual prompt comprises a second textual prompt 430 (e.g., a negative prompt) including a plurality of keywords indicating image characteristics to attempt to exclude in the to-be-generated one or more images of the space in the target style.

Identifying one or more furnishing products similar to the at least one furnishing detected in the at least one generated image may include calculating a similarity metric between the at least one furnishing (or an image of the at least one furnishing) and each of the furnishing products in the catalog of furnishing products (or images of such furnishing products), and identifying a given furnishing product in the catalog as similar when the similarity metric exceeds a threshold.

In some embodiments, the image of the space received form the client device may be processed to determine whether the image includes one or more characteristics that render it ineffective to be used to obtain the at least one generated image of the space in the target style.

In some embodiments, a GUI may be provided which includes a generated selectable marker for each detected furnishing in the at least one generated image, and responsive to a selection by the user of a furnishing via the selectable marker, the method may include identifying, in the catalog of furnishing products, one or more furnishing products similar to the selected furnishing.

In some embodiments, the generative ML model used to generate the one or more images of the space in the target style comprises a latent diffusion model that is configured to perform text-prompt-guided image-to-image translation. In some embodiments, the latent diffusion model comprises a Stable Diffusion model described in Rombach et. al., "High-Resolution Image Synthesis with Latent Diffusion Models," Computer Vision and Pattern Recognition, arXiv: 2112.10752, April 2022, which is incorporated by reference herein in its entirety.

In some embodiments, the generative ML model further comprises a second trained ML model configured to pre-process the image of the space, wherein processing the image of the space and the textual prompt using the generative ML model, comprises processing the image of the space using the second trained ML model to obtain a pre-processed image of the space; and processing the pre-processed image of the space and the textual prompt using the latent diffusion model.

In some embodiments, the second trained ML model is trained to control the latent diffusion model with task-specific conditions. In some embodiments, the second trained ML model is a trained neural network model configured to detected edges, lines, and/or key points in the image of the space. In some embodiments, the second trained ML model is a ControlNet model described in Zhang et. al., "Adding Conditional Control to Text-to-Image Diffusion Models," Computer Vision and Pattern Recognition, arXiv:2302.05543, February 2023, which is incorporated by reference herein in its entirety.

In some embodiments, information indicating multiple target styles may be received, a respective textual prompt for each of the multiple target styles may be generated to obtain multiple textual prompts, and the image of the space and the multiple textual prompts may be processed by using the generative ML model to obtain generated images of the space in each of the multiple target styles.

In some embodiments, detecting the at least one furnishing in the at least one generated image includes detecting the at least one furnishing using a trained neural network model trained to perform object detection to obtain at least one portion in the at least one generated image containing the detected at least one furnishing and at least one corresponding label indicating a type for any furnishing so detected. In some embodiments, each particular portion of the at least one portion is a bounding box (e.g., bounding box 230, 232) containing the corresponding furnishing detected in the particular portion.

In some embodiments, the searching comprises using a visual search technique to identify, in a first database storing the set of images of furnishing products in the catalog, the one or more images of furnishing products and corresponding one or more identifiers of the furnishing products.

After the identifier(s) of the furnishing products are identified, these identifiers may be used to access information about the corresponding furnishing products from a second database separate from the first database.

In some embodiments, the information about the one or more furnishing products identified in the catalog of furnishing products may be sent to the client device, where sending the information comprises providing the client device with images of the identified furnishing products and information to facilitate purchase of the identified furnishing products.

Some embodiments provide for a method for using a generative machine learning (ML) model to modify an image of a space (e.g., an image of a room), the method comprising: (A) receiving, from a client device, an image of the space and modification information, the modification information indicating: a portion of the image (e.g., portion 1020 shown in FIG. 10B) containing at least one furnishing (e.g., a table 1002 shown in FIG. 10A) to be replaced with an alternative portion having at least one alternative furnishing, at least one furnishing type for the at least one alternative furnishing (e.g., "sofa" shown FIG. 10A or "ottoman" shown in FIG. 10B), and a target style for the at least one alternative furnishing (e.g., "mid-century modern" shown in FIG. 10A); (B) generating, using the modification information, a textual prompt (e.g., prompt 1120 shown in FIG. 11) for use in prompting the generative ML model to generate at least one modified image of the space in which the portion of the image is replaced with at least one alternative portion; (C) processing the image of the space, information identifying the portion of the image, and the textual prompt by using the generative ML model to obtain at least one modified image of the space in which the portion of the image is replaced with the at least one alternative portion having the at least one alternative furnishing (e.g., image 1030 shown in FIG. 10C); (D) identifying, in a catalog of furnishing products (e.g., product catalog 150), one or more furnishing products (e.g., furnishing product 1042 shown in FIG. 10D) similar to the at least one alternative furnishing in the at least one modified image, the identifying comprising searching, using the at least one alternative portion and among a set of images of furnishing products in the catalog, for one or more images of furnishing products similar to the at least one alternative furnishing; and (E) sending, to the client device, information about the one or more furnishing products identified in the catalog of furnishing products.

Identifying one or more furnishing products similar to the at least one furnishing detected in the at least one generated image may include calculating a similarity metric between the at least one furnishing and each of the furnishing products in the catalog of furnishing products, and identifying a given furnishing product in the catalog as similar when the similarity metric exceeds a threshold. In some embodiments, the similarity metric may be a similarity metric between image(s) of the at least one furnishing and respective images of furnishing products in the catalog of furnishing products. In some embodiments, the similarity metric may be a distance measure (e.g., Euclidean, perceptually weighted), a hash-based measure, or a machine learning (ML) model-based determination of similarity.

In some embodiments, the image of the space received form the client device may be processed to determine whether the image includes one or more characteristics that render it ineffective to be used to obtain the at least one generated image of the space in the target style.

Figure 10A:
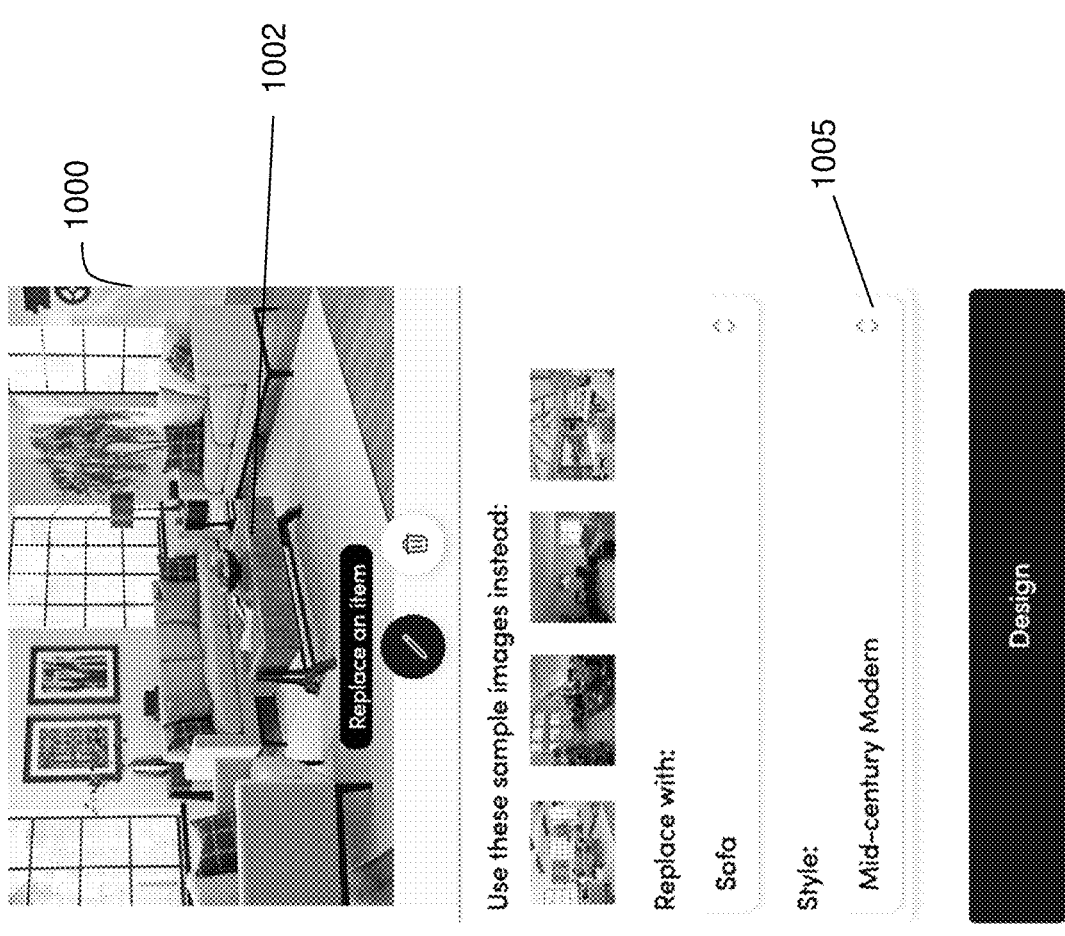
FIGS. 10A-10B are screenshots of example user interfaces through which the user may provide an image of a space and modification information for a replace process, according to some embodiments of the technology described herein.
Figure 10B:
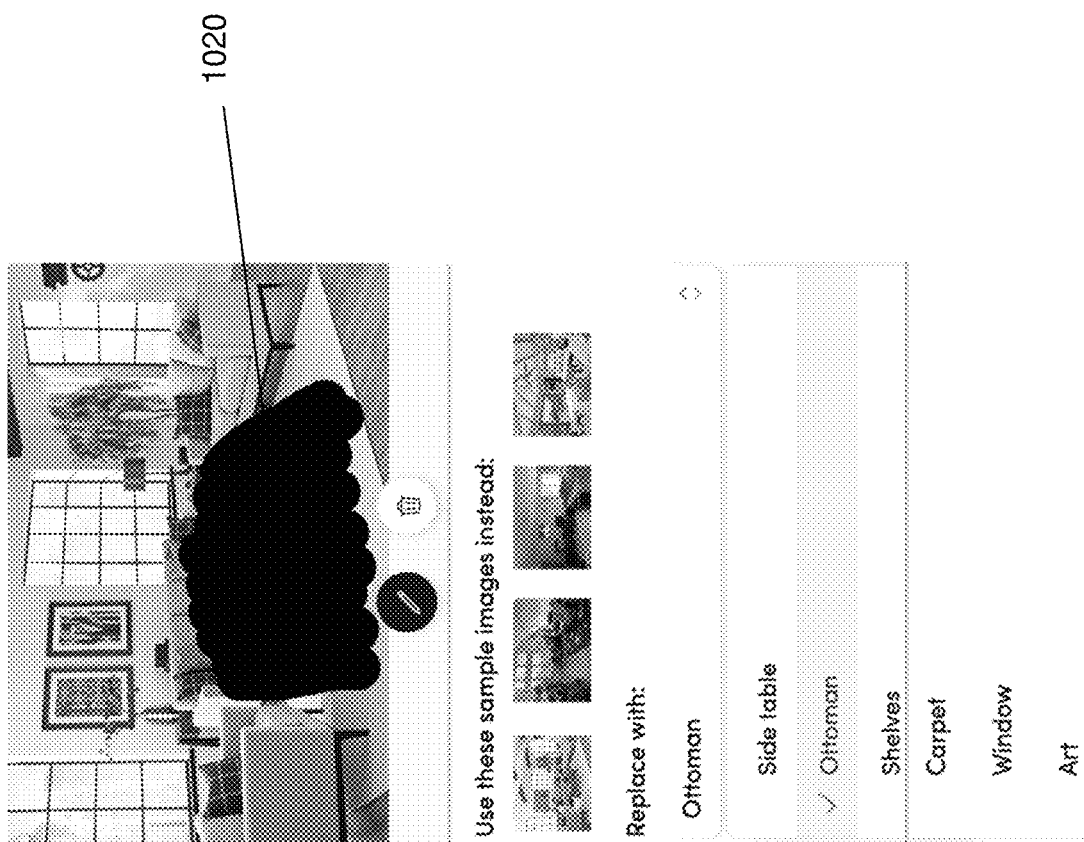
Figure 10C:
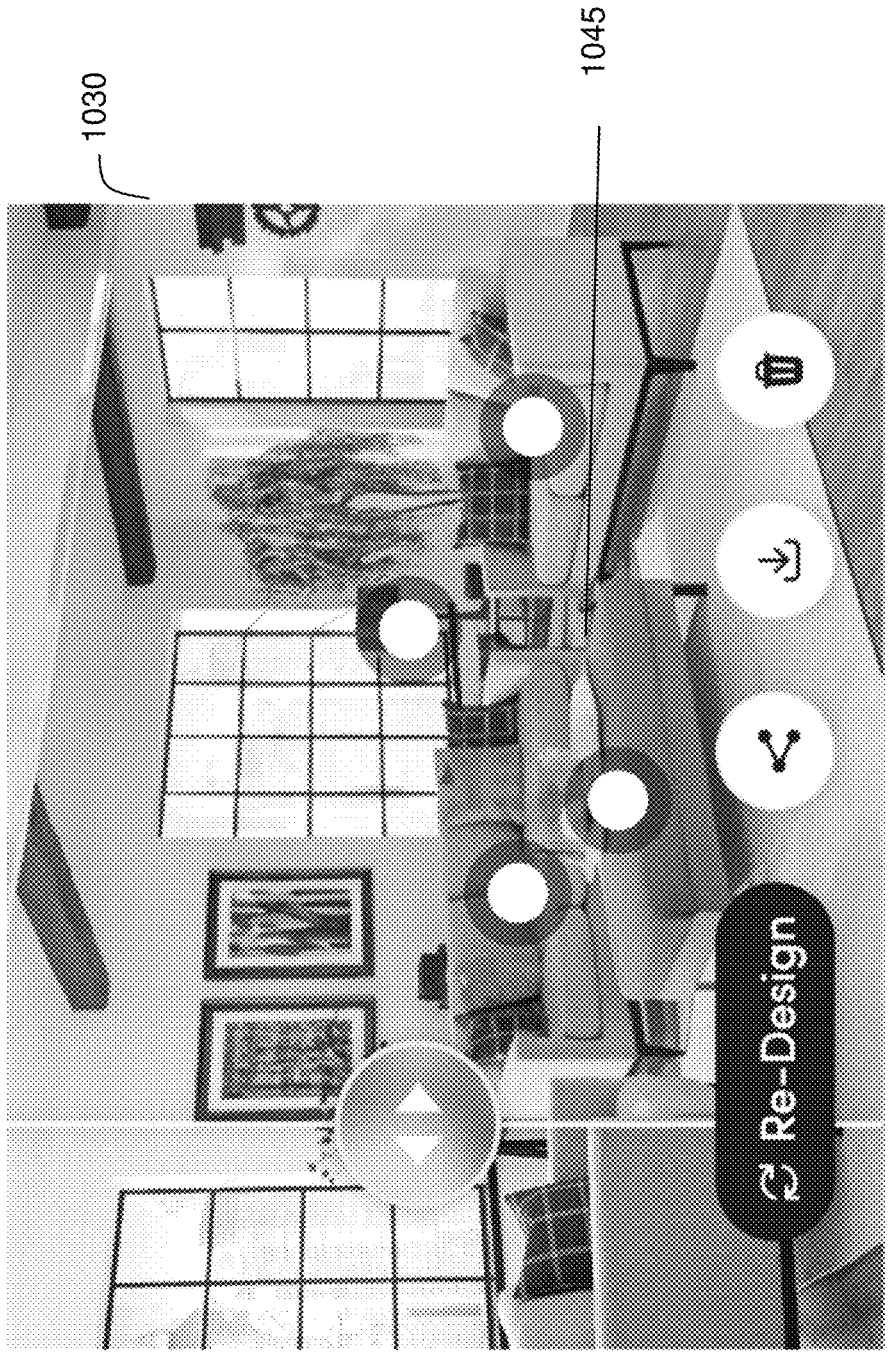
FIG. 10C is a screenshot of an example user interface showing a modified image of the space generated by a generative ML model used for generating modified images of spaces, according to come embodiments of the technology described herein.
Figure 10D:
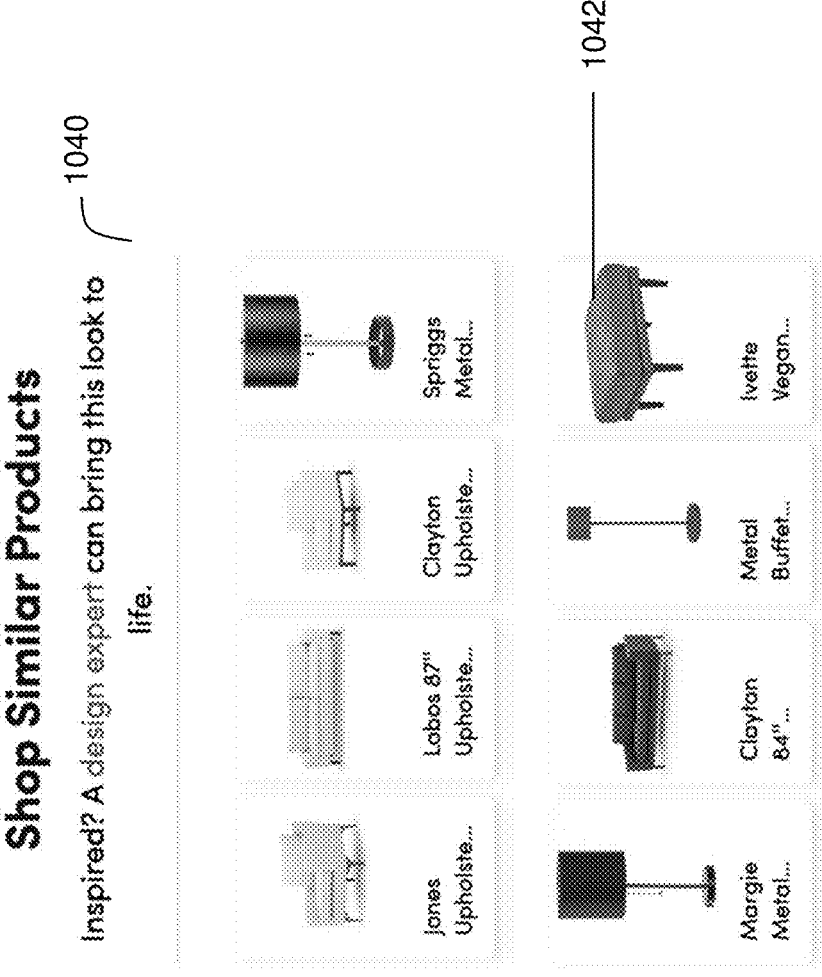
FIG. 10D is a screenshot of an example user interface showing a list of furnishing products similar to alternative furnishings in the modified image, according to some embodiments of the technology described herein.

In some embodiments, a method for using a generative machine learning (ML) model to modify an image of a space further comprises providing a graphical user interface (GUI) (as shown in FIGS. 10A-10B, for example) through which a user can provide the image of the space, the information identifying the portion of the image containing at least one furnishing to be replaced with an alternative portion having at least one alternative furnishing, the at least one furnishing type for the at least one alternative furnishing, and the target style for the at least one alternative furnishing; and receiving, via the GUI, the image of the space, the information identifying the portion of the image containing at least one furnishing to be replaced with an alternative portion having at least one alternative furnishing, the at least one furnishing type for the at least one alternative furnishing, and the target style for the at least one alternative furnishing.

In some embodiments, the GUI allows the user to draw on the image of the space (as shown in FIG. 10B, for example) in order to specify the portion of the image containing at least one furnishing to be replaced with an alternative portion having at least one alternative furnishing. In some embodiments, the GUI may include a generated selectable marker for each furnishing detected in the image of the space in order to specify the at least one furnishing to be replaced with at least one alternative furnishing.

In some embodiments, the textual prompt comprises a first textual prompt 1130 including a plurality of keywords indicating image characteristics to attempt to have in the at least one modified image of the space. In some embodiments, the textual prompt comprises a second textual prompt 1110 (e.g., a negative prompt) including a plurality of keywords indicating image characteristics to attempt to exclude in the at least one modified image of the space.

In some embodiments, the generative ML model used to modify an image of a space comprises a latent diffusion model that is configured to perform text-prompt-guided image-to-image translation. In some embodiments, the latent diffusion model comprises a Stable Diffusion model described in Rombach et. al., "High-Resolution Image Synthesis with Latent Diffusion Models," Computer Vision and Pattern Recognition, arXiv: 2112.10752, April 2022, which is incorporated by reference herein in its entirety. In some embodiments, the generative ML model used to modify an image of a space (i.e., redesign a specified portion of the space) does not include a second trained model, such as a ControlNet model, that used to pre-process the image of the entire space to be redesigned.

In some embodiments, searching for one or more images of furnishing products similar to the at least one alternative furnishing comprises using a visual search technique to identify, in a first database storing the set of images of furnishing products in the catalog, the one or more images of furnishing products and corresponding one or more identifiers of the furnishing products.

After the identifier(s) of the furnishing products are identified, these identifiers may be used to access information about the corresponding furnishing products from a second database separate from the first database.

In some embodiments, the information about the one or more furnishing products identified in the catalog of furnishing products may be sent to the client device, where sending the information comprises providing the client device with images of the identified furnishing products and information to facilitate purchase of the identified furnishing products.

Some embodiments provide for a method for identifying furnishing products in a catalog of furnishing products, the method comprising: (A) detecting at least one furnishing in at least one generated image of a space in a target style (e.g., furnishing 502, 504, 506, 508 in image 510), wherein the at least one generated image of the space in the target style is generated by processing an original image of the space using a generative ML model; (B) identifying, in a catalog of furnishing products, one or more furnishing products (e.g., furnishing products 520 shown in FIG. 5A) similar to the at least one furnishing detected in the at least one generated image, the identifying comprising: obtaining at least one portion of the at least one generated image containing the detected at least one furnishing; and searching, using the at least one portion and among a set of images of furnishing products in the catalog, for one or more images of furnishing products similar to the detected at least one furnishing; and (C) sending, to a client device, information about the one or more furnishing products identified in the catalog of furnishing products.

Identifying one or more furnishing products similar to the at least one furnishing detected in the at least one generated image may include calculating a similarity metric between the at least one furnishing and each of the furnishing products in the catalog of furnishing products, and identifying a given furnishing product in the catalog as similar when the similarity metric exceeds a threshold.

In some embodiments, a graphical user interface may be provided that displays the at least one generated image of the space and the original image of the space next to each other. For example, an original image 1210 of the space shown in FIG. 12A and the generated image 1220 of the space shown in FIG. 12B may be displayed in a graphical user interface next to each other or side-by-side.

In some embodiments, a graphical user interface may be provided that includes a slider GUI element (e.g., GUI element 550), wherein manipulation of the slider GUI element (e.g., movement from left to right or right to left) causes switching between views of the at least one generated image of the space and the original image of the space.

In some embodiments, sending the information about the one or more furnishing products identified in the catalog of furnishing products comprises providing the client device with images of the identified furnishing products and information to facilitate purchase of the identified furnishing products.

In some embodiments, a selectable marker may be generated for each furnishing detected in the at least one generated image of the space (e.g., selectable markers 562, 564, 566, 568), where the selectable marker corresponds to one or more images of furnishing products identified as being similar to the detected furnishing in the catalog of furnishing products. For example, marker 562 corresponds to images of furnishing products shown in FIG. 6A Similarly, marker 568 corresponds to images of furnishing products shown in FIG. 6B. In some embodiments, a graphical user interface is provided that displays the selectable markers overlaid on the corresponding detected furnishings, as shown in FIG. 5A, for example. In some embodiments, the selectable markers may be displayed at other locations, such as next to the corresponding detected furnishings.

In some embodiments, selection of a selectable marker causes the one or more images of the furnishing products identified as being similar to the corresponding detected furnishing to be displayed in the graphical user interface.

As used herein, the term "space" may refer to any indoor or outdoor space of a property. A space may be an indoor space inside of a property, such as a room or hallway, or an outdoor space outside the property, such as a yard or porch. For example, a space in a home may be a front yard, a back yard, a side yard, a porch, a garage, a living room, a bedroom, a kitchen, a bathroom, a dining room, a family room, a basement, an attic, a closet, a laundry room, a foyer, a hallway, and/or a mud room. A space may have means of ingress and/or egress for entering and/or exiting the space. Such means may include doors, doorways, windows, etc.

As used herein, the term "furnishing" may refer to any article used in readying a space (e.g., a room, a patio, etc.) for occupancy and/or use. Non-limiting examples of furnishing may include furniture, wall coverings, window treatments, floor coverings, fixtures, and fittings, and/or other decorative accessories. Furniture may include: living room furniture (e.g., sofas, sectionals, loveseats, coffee tables, end tables, tv stands, media storage, chairs, seating, ottomans, poufs, bookcases, cabinets, chests, console tables, futons, daybeds, fireplaces, etc.), bedroom furniture (beds, headboards, dressers, chests, nightstands, daybeds, vanities, stools, armoires, wardrobes, benches, bunk beds, etc.), mirrors, tables and chairs, kitchen and dining furniture (e.g., dining tables and chairs, bar tables and stools, kitchen carts, sideboards, buffets, display cabinets, china cabinets, baker's racks, food pantries, wine racks, etc.), office furniture (e.g., desks, chairs, bookcases, filing cabinets, storage cabinets, computer equipment stands, etc.), entry and mudroom furniture (e.g., console tables, hall trees, cabinets, storage benches, shoe storage, coat racks, umbrella stands, etc.), outdoor and patio furniture (e.g., tables, chairs, umbrellas, etc.), bathroom furniture (e.g., vanities, cabinets, etc.), game furniture, and/or any other suitable furniture. Wall coverings may include wall tiles, wallpaper, wall art, wall paint, etc. Window treatments may include curtains, shades, curtain hardware (e.g., curtain rods), and/or other treatments. Floor coverings may include flooring tiles, carpets, hardwood flooring, rugs, etc. Fixtures and fittings may include items that are integrated with or attached to the property (e.g., light fixtures, built-in furniture, existing/installed cabinetry (e.g., bath or kitchen cabinetry), sink, toilet, fireplace, etc.) and items that are not attached to the property (e.g., free-standing appliances (a microwave or air fryer), rugs, etc.).

It should be appreciated that the embodiments described herein may be implemented in any numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

Figure 1:
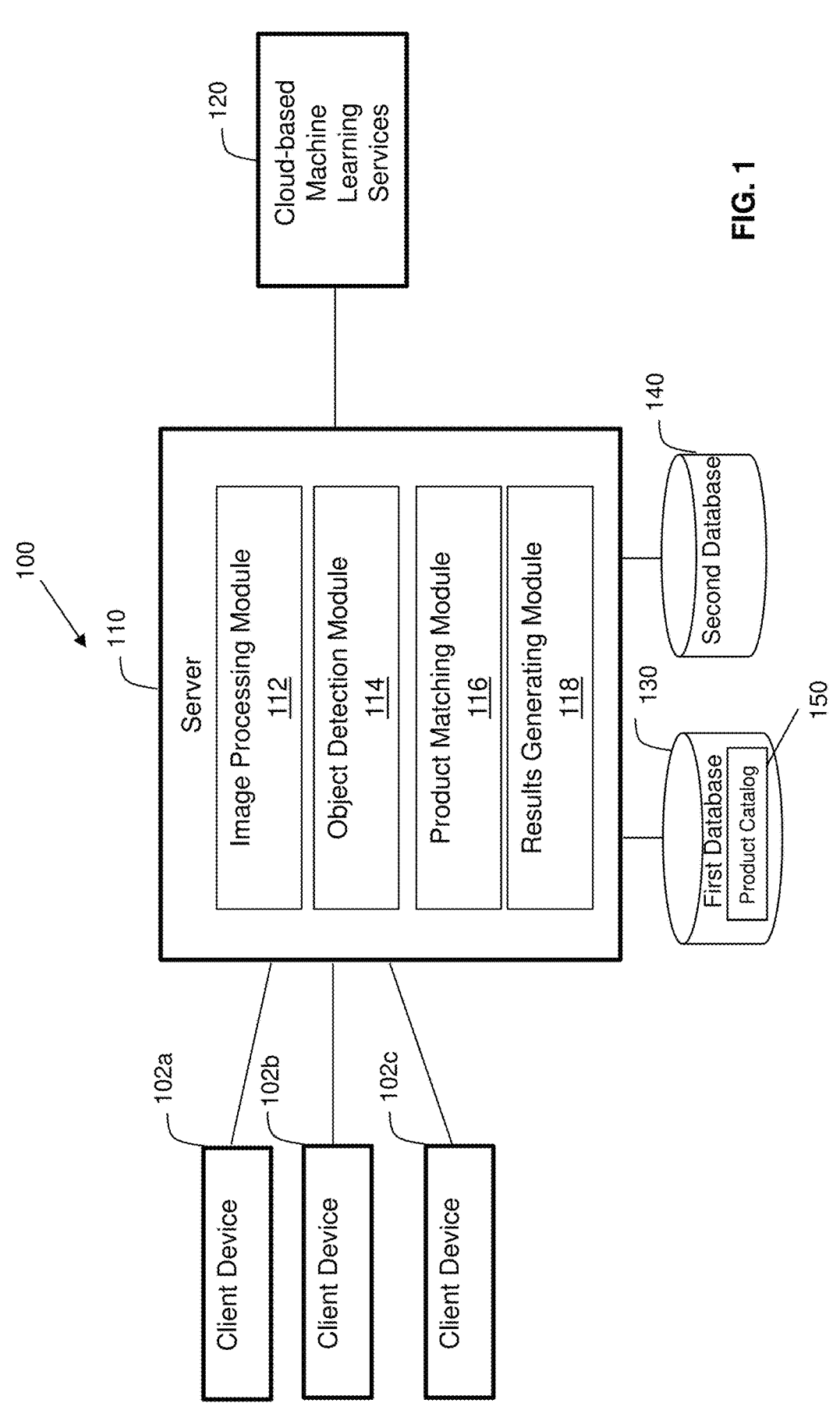
FIG. 1 is a block diagram of an example system in which some embodiments of the technology described herein may be implemented.

FIG. 1 shows a block diagram of an example system in which some embodiments of the technology described herein may be implemented. System 100 may include client devices 102a, 102b, 102c (referred to herein as "102"), server 110, and cloud-based machine learning services 120. Client device 102 may include a user interface (not shown) installed thereon. The user interface may be an application downloadable from the Internet. The client device 102 may be an electronic portable device, such as a smart phone or a tablet PC. In other examples, the client device 102 may be a computer (e.g., a desktop computer, a tablet PC, a terminal device) in a brick-and-mortar store that a user (e.g., designer or other user) may use to provide input images to and receive output images from the server 110 via the user interface. The user interface may be a browser executable on the client device 102 on which the user interface is installed. The user interface may enable a user to provide an image of a space and information indicating a target style for the space when initiating a request to redesign the space. The user interface may also enable a user to provide an image of a space and modification information when initiating a request to modify the image of the space by replacing a piece of furnishing in the space.

In some embodiments, the user may access the redesign tool via the user interface. For example, the tool may be accessed via web page(s) displayed using a web browser. Initially, a login page may be displayed via which a user may initiate an authentication process. For example, the user may provide a login id and password for authentication and authorization. As another example, an OAuth (open authorization) framework may be utilized for authorization without requiring password input. As yet another example, user authentication may be performed by sending an authentication link to the user's email address. In some embodiments, the authentication/authorization process may be performed by an authentication module (not shown) of the server 110.

Figure 4A:
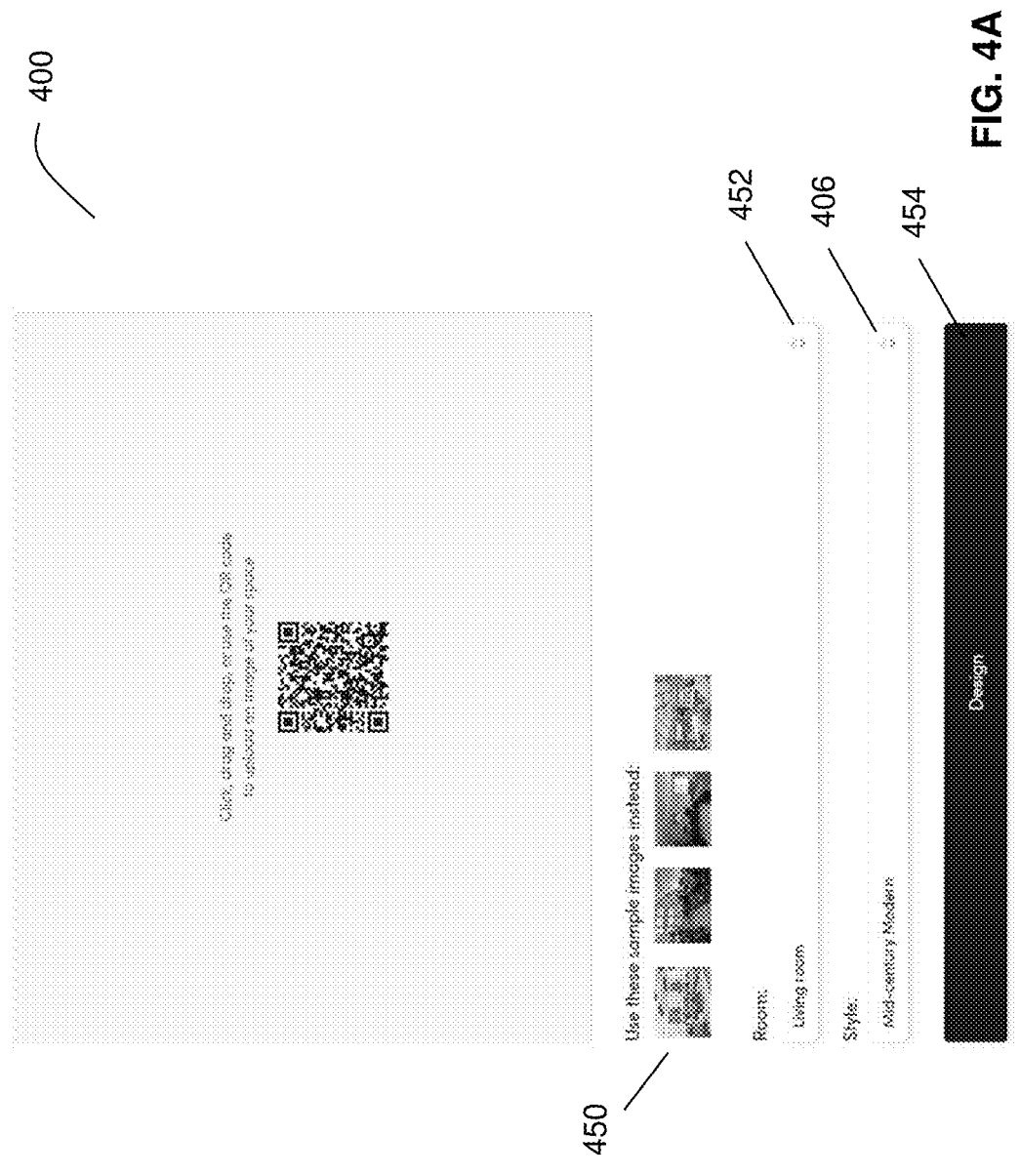
FIG. 4A is a screenshot of an example user interface through which the user may provide an image of a space and information indicating a target style for the space for a redesign process, according to some embodiments of the technology described herein.

After successful authentication, a design page may be displayed via which the user may initiate a space redesign process or a space modification process (also referred to herein as "replace process"). For example, a graphical user interface 400 (as shown in FIG. 4A) may be displayed via which the user may initiate the space redesign process. As another example, a graphical user interface 1000 (as shown in FIG. 10A) may be displayed via which the user may initiate the space modification or replace process.

In some embodiments, an image of a space to be redesigned may be provided by the user. For example, the user may upload the image of the space or select one of the existing sample images 450 as shown in FIG. 4A. In some embodiments, the image of the space may be uploaded using a camera of the client device 102 when the user interface (e.g., a web page) is open on the client device 102. The user may specify a space type via GUI element 452 (for example, living room, bedroom, etc.) and a target style for the space via GUI element 406 (e.g., mid-century modern, contemporary, etc.). Selection of the "Design" button 454 may cause the client device 102 to communicate the image of the space, space type and target style information to the server 110. In some embodiments, the image of the space may be a sketch of the space, for example, hand-drawn by the user or generated using line drawings from a digital tool.

In some embodiments, server 110 may include an image processing module 112, an object identification module 114, a product matching module 116, and a results generation module 118. The image processing module 112 may process the image of the space received from the client device 102 to determine whether the image includes one or more characteristics (e.g., includes humans, includes memes, is blurry, etc.) that render it ineffective to be used for the redesign process or replace process. In some embodiments, upon successful verification that the image is usable for the redesign process, the image processing module 112 may generate, from information indicating the target style and/or space type for the space, a textual prompt for use in prompting a generative ML model to generate image(s) of the space in the target style. For example, FIG. 4B shows an example textual prompt 420 including one or more keywords indicating the space type and the target style selected by the user. In some embodiments, the image processing module 112 may generate the textual prompt without performing the image verification process.

In some embodiments, image processing module 112 may generate additional prompts for use in prompting the generative ML model to generate image(s) of the space in the target style. For example, FIG. 4B shows an example textual prompt 430 that includes a plurality of keywords indicating image characteristics to attempt to have in the to-be-generated one or more images of the space in the target style. FIG. 4B shows another example textual prompt 410 that includes a plurality of keywords indicating image characteristics to attempt to exclude in the to-be-generated one or more images of the space in the target style. One or more of these prompts may be used in prompting the generative ML model.

In some embodiments, the server 110 may invoke one or more cloud-based machine learning services 120 to generate one or more images of the space in the target style. Example cloud-based machine learning services include, but are not limited to, Replicate, and VertexAI. In some embodiments, a cloud-based machine learning service 120 may process the image of the space and the textual prompt(s) by using a generative ML model (e.g., generative ML model 204 shown in FIG. 2) to obtain at least one generated image of the space (e.g., image 206 shown in FIG. 2) in the target style. In some embodiments, the generative ML model may include a Stable Diffusion model. Example inputs that may be provided to the generative ML model include, but are not limited to, the image of the space, the textual prompt(s), a number of sampling steps, a seed (i.e., number from which the model generates noise or controls randomness in the image generation), a resolution of the image to be generated, a number of images to be output, and/or other inputs.

In some embodiments, the generative ML model may include a second trained ML model configured to preprocess the image of the space. The second trained ML model may process the image of the space to obtain a pre-processed image of the space. In some embodiments, the pre-processed image of the space may include an image generated by applying an LSD (line segment detection) technique that is used to detect line segments in images. In some embodiments, the second trained ML model may include a trained neural network model (e.g., a ControlNet model) configured to detect edges, lines (e.g., straight lines) and/or key points in the image of the space. For example, the second trained ML model may detect straight lines in the image and generate a pre-processed image that includes the straight lines. This pre-processed image and the textual prompt(s) may be processed using the generative ML model to obtain at least one generated image of the space (e.g., image 206 shown in FIG. 2) in the target style.

Figure 13:
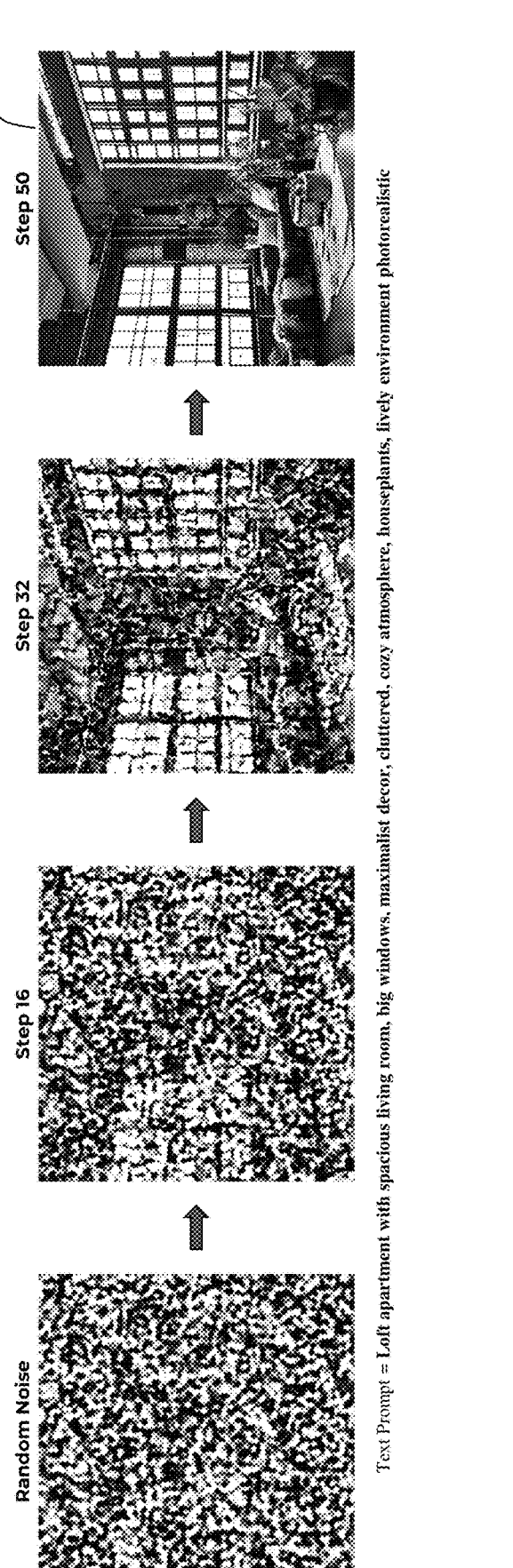
FIG. 13 shows an example image generated by a generative ML model after fifty iterations, according to some embodiments of the technology described herein.

In some embodiments, the generative ML model, such as the Stable Diffusion model starts with an image of random noise and through iteration, creates an image guided by the textual prompt(s) and the image of the space provided by the user. For example, FIG. 13 shows an image 1350 generated by the generative ML model after fifty iterations/steps. In some embodiments, the generative ML model may be trained on a large dataset of images. For each image, noise is added, and a noise predictor is trained to provide a clean image given the noisy image.

In some embodiments, the generative ML model may generate multiple images of the space in the target style. For example, FIG. 2 shows four images 201, 203, 204, 206 generated by the generative ML model 204. The four images may be presented to the user via a graphical user interface. A user selection of one of the images, for example image 206, may be received via the graphical user interface.

In some embodiments, an object detection module 114 may detect at least one furnishing in the at least one generated image 206 generated by the generative ML model 204. The object detection module 114 may also classify the detected furnishings into categories or types of furnishings. In some embodiments, the object detection module 114 may detect the at least one furnishing in the generated image 206 using a trained neural network model trained to perform object detection to obtain at least one portion (e.g., portions 230, 232) in the generated image containing the detected at least one furnishing and at least one corresponding label indicating a type (e.g., wall art, couches, sofas, arm chairs, tables, lamps, etc.) for any furnishing so detected. In some embodiments, each particular portion 230, 232 is a bounding box containing the corresponding furnishing detected in the particular portion.

In some embodiments, the product matching module 116 may identify, in a catalog 150 of furnishing products, one or more furnishing products similar to the at least one furnishing detected in the at least one generated image. The product catalog 150 may include images of various furnishing products offered by the online retailer. For each image, the product catalog may store an identifier of the corresponding furnishing product in the image and/or other metadata associated with the finishing product that may assist or otherwise be used by the product matching module 116 when performing or generating results of the product identification process.

In some embodiments, the product matching module 116 may obtain portion(s) (e.g., portions 230, 232) of the generated image containing the detected furnishing(s) and search using the portion(s) and among a set of images of furnishing products in the catalog 150, for one or more images of furnishing products similar to the detected furnishing(s). For example, for each furnishing (e.g., sofa, wall art) detected in the generated image 206, the product matching module 116 may obtain the corresponding portion (e.g., 230, 232) of the generated image 206 that contains the detected furnishing. The product matching module 116 may search for images of furnishing products in the catalog 150 that are similar to each detected furnishing. The search may be performed using the obtained portion of the generated image containing the detected furnishing.

In some embodiments, the product matching module 116 may perform the search using a visual search technique to identify, in a first database 130 storing the set of images of furnishing products in the catalog 150, the image(s) of furnishing products (i.e., images of the furnishing products similar to the detected furnishing(s)) and corresponding identifier(s) of the furnishing products. In some embodiments, the visual search technique may compare a portion of the generated image containing the detected furnishing with image(s) of furnishing products in the product catalog 150 to identify furnishing products that are similar to the detected furnishing.

In some embodiments, for each detected furnishing, the product matching module 116 may identify multiple furnishing products similar to the detected furnishing. For example, for a sofa detected in the generated image 206, the product matching module 116 may search through the product catalog 150 to identify images of multiple sofas offered by the online retailer that are similar to the detected sofa.

In some embodiments, the product matching module 116 may calculate a similarity metric between the portion of the generated image containing the detected furnishing and image(s) of furnishing products in the product catalog 150, and identify a given furnishing product in the catalog as similar when the similarity metric exceeds a threshold. The product matching module 116 may utilize one or more image similarity determination techniques, such as distance measure based methods, hash-based methods, histogram-based techniques that compare histograms of two images, where the histograms capture distribution of pixel values in the images; structural similarity index (SSIM)-based techniques that analyze structural (e.g., luminance, contrast, and structure) similarity between the two images; feature-based techniques that extract features from images, such as edges and corners, which are then used for comparison of the images; machine earning techniques (e.g., deep learning models, neural network models) that extract features from images that can then be used for comparison of the images.

In some embodiments, second database 140 may store a record associated with each instantiation of the redesign or replace process. For example, for each design/replace request (e.g., when the user clicks the design button), a record may be generated in the second database. The record may store the image of the space provided as input, the generated image or modified generated by the generative ML model, positions of detected furnishings in the generated image or positions of alternative furnishings in the modified image, parameters associated with the request (e.g., type of room selected, target style selected, information about the user who initiated the request (e.g., email address, user id, user type (e.g., designer, visitor, etc.), type of access (e.g., advanced, regular, etc.), mask in case of the replace process, etc.), results generated by the product matching module 116 (e.g., a list of furnishing products similar to detected furnishing(s) in the image and their corresponding product identifiers (such as SKUs) or a list of furnishing products similar to the alternative furnishings in the modified image and their correspond product identifiers), and/or other information.

In some embodiments, the second database 140 may also store additional information about the furnishing products identified as similar to the detected furnishing(s) or similar to the alternative furnishings. For example, the additional information may include product description information, pricing information, shipping information, reviews information, and/or any other information that may be used to facilitate purchase of the identified furnishing products.

In some embodiments, results generating module 118 may access, using the one or more identifiers of the furnishing products and in the second database separate from the first database, the information about the one or more furnishing products. The results generating module 118 may send to the client device 102, information about the one or more furnishing products identified in the catalog of furnishing products. The results generating module 118 may provide the client device 102 with images of the identified furnishing products and information to facilitate purchase of the identified furnishing products. For example, the results generating module 118 may generate a list or images 214 of the identified furnishing products (i.e., furnishing products identified as similar to detected furnishing(s) in the generated image). The list may include for each identified furnishing product, information about the furnishing product, such as, pricing, reviews, and a link to the product page associated with the furnishing product. Also included is an option to add a desired furnishing product to the cart for purchase.

In some embodiments, the generative ML model 204 may generate multiple images of the space in the target style or multiple images of the space in different target styles. For each generated image of the space, the server 110 may perform object detection, class identification, visual search, and results generation as described herein. In some embodiments, a result listing (e.g., list 214) may be generated for each generated image and the user may toggle between the result listing by selecting the corresponding image for which the result listing was generated. For example, although not shown in FIG. 2, a result listing may be generated for each of the other generated images 201, 203, 205. Selection of a generated image, such as image 203, may cause the result listing associated with the image 203 to be presented to the user via the graphical user interface.

FIG. 3A is a flowchart of an example process 300 for using a generative machine learning (ML) model to generate one or more images of a space in one or more target styles. Process 300 may be performed by any suitable computing device or platform, such as a cloud computing platform. For example, process 300 may be performed by server 110 described above with reference to FIGS. 1-2.

Process 300 begins at block 302, where the system performing process 300 receives, from a client device 102, an image of the space, and information indicating a target style for the space. For example, as shown in FIG. 4A, the user may upload an image of the space (or select from various sample images) and select a target style via a drop-down menu 406. In some embodiments, the user may also select a room type for the image of the space via drop-down menu 452. When the user selects the design button 454, the image of the space and the selected information may be communicated to the server 110.

At block 304, the system performing the process 300 generates, from the information indicating the target style for the space, a textual prompt for use in prompting the generative ML model to generate one or more images of the space in the target style. For example, a textual prompt 420 may be generated when the user provides an image of a living room and indicates a target style as "coastal".

At block 306, the system performing the process 300 processes the image of the space and the textual prompt by using the generative ML model to obtain at least one generated image of the space in the target style. In some embodiments, the server 110 may provide the image of the space and the textual prompt to a cloud-based machine learning service 120 that executes the generative ML model based on the provided input and provides the generated images of the space in the target style to the server 110. In these embodiments, the server 110 may receive the generated images obtained by processing the image of the space and the textual prompt using the generative ML model. For example, FIG. 5A shows an example image 510 of the living room generated by using the generative ML model in the "mid-century modern" style. FIG. 7 shows another example image 710 of the living room generated by using the generative ML model in the same "mid-century modern" style. As shown in FIG. 5B, a slider GUI element 550 may be provided that allows a user to flip between viewing the original image of the space and the generated image of the space in the target style.

Figure 8C:
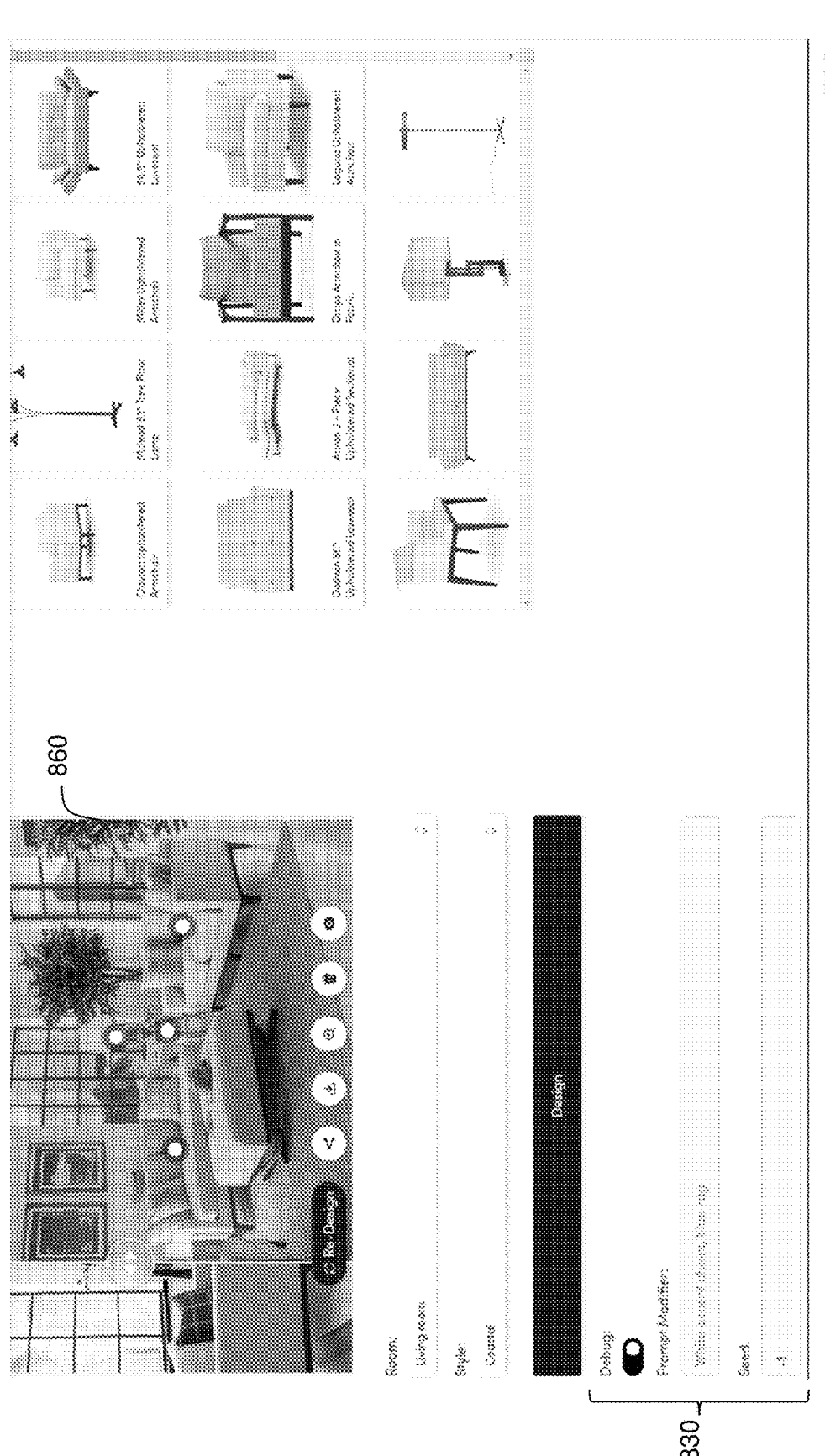
FIG. 8C is a screenshot of an example user interface showing a debug menu through which a user can modify a textual prompt or provide a custom prompt and/or modify or provide a seed value to be provided to the generative ML model for generating the image in the target style, according to some embodiments of the technology described herein.

As shown in FIGS. 8A-8B, selection of a different target style (e.g., Bohemian) causes the generative ML model to generate a different image 810 in the selected style. In some embodiments, the redesign tool may be used by a designer or other advanced user and the system may allow such a user to control the iterative regeneration of the image using the generative ML model. For example, the user interface, as shown in FIG. 8C, may expose a debug menu 830 through which the user may modify the textual prompt and/or seed value or provide a custom prompt and/or seed value. As shown, modification of the textual prompt by including keywords (e.g., white accent chairs, blue rug) indicating image characteristics to attempt to have in the to-be-generated image of the space in the target style (e.g., coastal), causes the generative ML model to generate an image 860 that includes these characteristics.

In some embodiments, the at least one generated image may be created using one or more Digital Content Creation (DCC) tools, one or more other image generation technologies, and/or a combination of image generation technologies. Example DCC tools include, but are not limited to, Adobe and Autodesk.

At block 308, the system performing process 300 detects at least one furnishing in the at least one generated image. The system performing process 300, at block 310, identifies, in a catalog of furnishing products, one or more furnishing products similar to the at least one furnishing detected in the at least one generated image. In some embodiments, for each furnishing detected in the generated image, the system identifies furnishing products similar to the detected furnishing. The system may identify the furnishing products by using a visual search technique to identify, in a first database storing a set of images of furnishing products in the catalog, one or more images of furnishing products that are similar to a portion of the generated image including the detected furnishing and corresponding one or more identifiers of the furnishing products.

At block 312, the system performing process 300 sends to the client device 102, information about the one or more furnishing products identified in the catalog of furnishing products. In some embodiments, the information about the identified furnishing products may be obtained from the second database 140. The system performing process 300 may provide the client device 102 with images of the identified furnishing products and information to facilitate purchase of the identified furnishing products. As shown in FIG. 5A, the generated image 510 is displayed in the user interface with the various furnishings detected in the generated image 510 highlighted by markers (e.g., markers 562, 564, 566, 568). The detected furnishings may be highlighted in any suitable way without departing from the scope of this disclosure. The user interface may also display a listing 520 of furnishing products offered by the online retailer that are similar to the detected furnishing(s). In some embodiments, a marker may be generated for each furnishing detected in the generated image and the furnishing may be tagged with the marker in the generated image. The markers may be selectable, such that selection of a particular marker corresponding to a detected furnishing, causes the furnishing products similar to that detected furnishing product to be displayed in the user interface. For example, as shown in FIG. 6A, selection of marker 562 causes a list or images 602 of furnishing products similar to the corresponding furnishing to be displayed on the right. Similarly, as shown in FIG. 6B, selection of marker 568 causes a list or images 604 of furnishing products similar to the corresponding furnishing to be displayed on the right.

Figure 12A:
FIG. 12A is a screenshot of an example image of the space provided by a user, according to some embodiments of the technology described herein.
Figure 12B:
FIGS. 12B-12J are screenshots of example user interfaces displaying different generated images of the space in different target styles, according to some embodiments of the technology described herein.
Figure 12C:
Figure 12D:
Figure 12E:
Figure 12F:
Figure 12G:
Figure 12H:
Figure 12I:
Figure 12J:

FIG. 12A shows an image of the space provided by a user (e.g., an image uploaded by the user via GUI 400). FIGS. 12B-12J show examples of different generated images of the space in different target styles. In some embodiments, the results of various design requests initiated by the user may be stored. FIG. 9 shows a GUI including a listing of the various design requests along with information regarding the design request (e.g., the room type, the target style selected, an amount of time it took the generative ML model to generate the image in the target style along with the number of iterations/steps taken, the date when the design request was initiated, and/or other information). Selection of any particular tab (e.g., tab 902, 904) causes the results of the design request to be displayed (for example, the results shown in FIGS. 8C and 5A, respectively).

As described above, the redesign tool further enables consumers to specify, in an input image of the space, a particular furnishing that they wish to replace with an alternative furnishing. The redesign tool generates a modified image of the space that includes the alternative furnishing using a generative ML model and identifies furnishing products offered by the online retailer that are similar to the alternative furnishing. FIG. 3B is a flowchart of an example process 350 for using a generative ML model to modify an image of a space. Process 350 may be performed by any suitable computing device or platform, such as a cloud computing platform. For example, process 350 may be performed by server 110 described above with reference to FIGS. 1-2.

Process 350 begins at block 352, where the system performing process 350 receives, from a client device 102, an image of the space and modification information, where the modification information indicates (a) a portion of an image containing at least one furnishing to be replaced with an alternative portion having at least one alternative furnishing, (b) at least one furnishing type for the at least one alternative furnishing, and (c) a target style for the at least one alternative furnishing. For example, as shown in FIGS. 10A-10B, a user may indicate a piece of furniture, for example, a table 1002 to be replaced in an image of the space 1000 by marking a portion of the image 1020 that includes the piece of furniture and select an alternative piece of furniture of a particular type (e.g., an ottoman). The user may indicate a target style for the alternative furnishing via drop-down menu 1005. When the user selects the design button, the image of the space and the modification information may be communicated to the server 110.

At block 354, the system performing the process 350 generates, using the modification information, a textual prompt for use in prompting the generative ML model to generate at least one modified image of the space in which the portion of the image (e.g., portion 1020) is replaced with at least one alternative portion (e.g., portion corresponding to the alternative furnishing). For example, a textual prompt 1120, shown in FIG. 11, may be generated when the user indicates that a particular portion of the image be replaced with an accent chair in a modern farmhouse style. In some embodiments, additional prompts 1110 and 1130 may be generated.

In some embodiments, upon successful verification that the image of the space is usable for the replace process, the image processing module 112 may generate, using the modification information, the textual prompt(s) for use in prompting the generative ML model. In some embodiments, the image processing module 112 may generate the textual prompt(s) without performing the image verification process.

In some embodiments, the image processing module 112 may generate additional prompts for use in prompting the generative ML model to generate at least one modified image of the space. For example, FIG. 11 shows an example textual prompt 1130 that includes a plurality of keywords indicating image characteristics to attempt to have in the to-be-generated at least one modified image of the space. FIG. 11 shows another example textual prompt 1110 that includes a plurality of keywords indicating image characteristics to attempt to exclude in the to-be-generated at least one modified image of the space. One or more of these prompts may be used in prompting the generative ML model.

At block 356, the system performing the process 350 processes the image of the space, information identifying the portion of the image containing at least one furnishing to be replaced with an alternative portion having at least one alternative furnishing, and the textual prompt(s) by using the generative ML model to obtain at least one modified image of the space in which the portion of the image is replaced with the at least one alternative portion having the at least one alternative furnishing.

In some embodiments, the server 110 may invoke one or more cloud-based machine learning services 120 to generate the at least one modified image of the space in which the portion of the image is replaced with at least one alternative portion. In some embodiments, a cloud-based machine learning service 120 may process the image of the space, information identifying the portion of the image, and the textual prompt(s) by using a generative ML model to obtain the at least modified image of the space (e.g., image 1030 shown in FIG. 10C) in which the portion of the image with the table is replaced with an alternative portion 1045 having the ottoman.

In some embodiments, the generative ML model may include a Stable Diffusion model that accepts a mask as input, where the mask is generated based on the modification information. The mask may include a black and white image where the portion of the image to be replaced is white and the rest of the image is black. In some embodiments, the generative ML model utilizes the mask to generate a modified image in which the portion of the image (i.e., the portion containing the furnishing to the replaced) is replaced with the at least one alternative portion without altering the rest of the image.

In some embodiments, a user may upload an image of the space and use the replace process to ensure that a particular anchor piece furnishing is kept in place while the rest of the image is modified to include alternative furnishings. In these embodiments, the user may mark the portion of the image to be replaced or changed and a mask may be generated to be provided as input to the generative ML model. The generative ML model may utilize the mask to generate modified images of the space while keeping the anchor piece in place.

In some embodiments, example inputs that may be provided to the generative ML model used for the replace process may include, but not be limited to, the image of the space, the textual prompt(s), a mask, a number of sampling steps, a seed (i.e., number from which the model generates noise or controls randomness in the image generation), a resolution of the image to be generated, a number of images to be output, and/or other inputs. In some embodiments, the Stable Diffusion model used for the replace process and the redesign process may be the same albeit with one or more different and/or additional inputs.

The system performing process 350, at block 358, identifies, in a catalog of furnishing products, one or more furnishing products similar to the at least one alternative furnishing in the at least one modified image. In some embodiments, for each alternative furnishing in the modified image, the system identifies furnishing products similar to the alternative furnishing. In some embodiments, the product matching module 116 may search using the alternative portion(s) (e.g., portion 1045) and among a set of images of furnishing products in the catalog 150, for one or more images of furnishing products similar to the alternative furnishing(s). For example, for each alternative portion in the modified image (e.g., image 1030 of FIG. 10C) having an alternative furnishing, the product matching module 116 may search for images of furnishing products in the catalog 150 that are similar to the alternative furnishing.

In some embodiments, the system performing process 350 may identify the furnishing products by using a visual search technique to identify, in a first database 130 storing a set of images of furnishing products in the catalog 150, one or more images of furnishing products that are similar to the alternative furnishing(s) and corresponding one or more identifiers of the furnishing products.

At block 360, the system performing process 350 sends to the client device 102, information about the one or more furnishing products identified in the catalog of furnishing products. In some embodiments, the information about the identified furnishing products may be obtained from the second database 140. The system performing process 350 may provide the client device 102 with images of the identified furnishing products and information to facilitate purchase of the identified furnishing products.

In some embodiments, for each alternative furnishing, the product matching module 116 may identify one or more furnishing products similar to the alternative furnishing. For example, for the ottoman in the modified image 1030, the product matching module 116 may search through the product catalog 150 to identify images of one or more ottomans offered by the online retailer that are similar to the ottoman in the modified image. In some embodiments, the user interface may also display a listing or images 1040 of furnishing products offered by the online retailer that include products (e.g., product 1042) similar to the ottoman.

In some embodiments, the number of similar furnishing products identified by the system during the redesign or replace process is configurable. For example, one, two, three, four, five, or any other suitable number of similar furnishing products may be identified and displayed without departing from the scope of this disclosure.

Figure 14A:
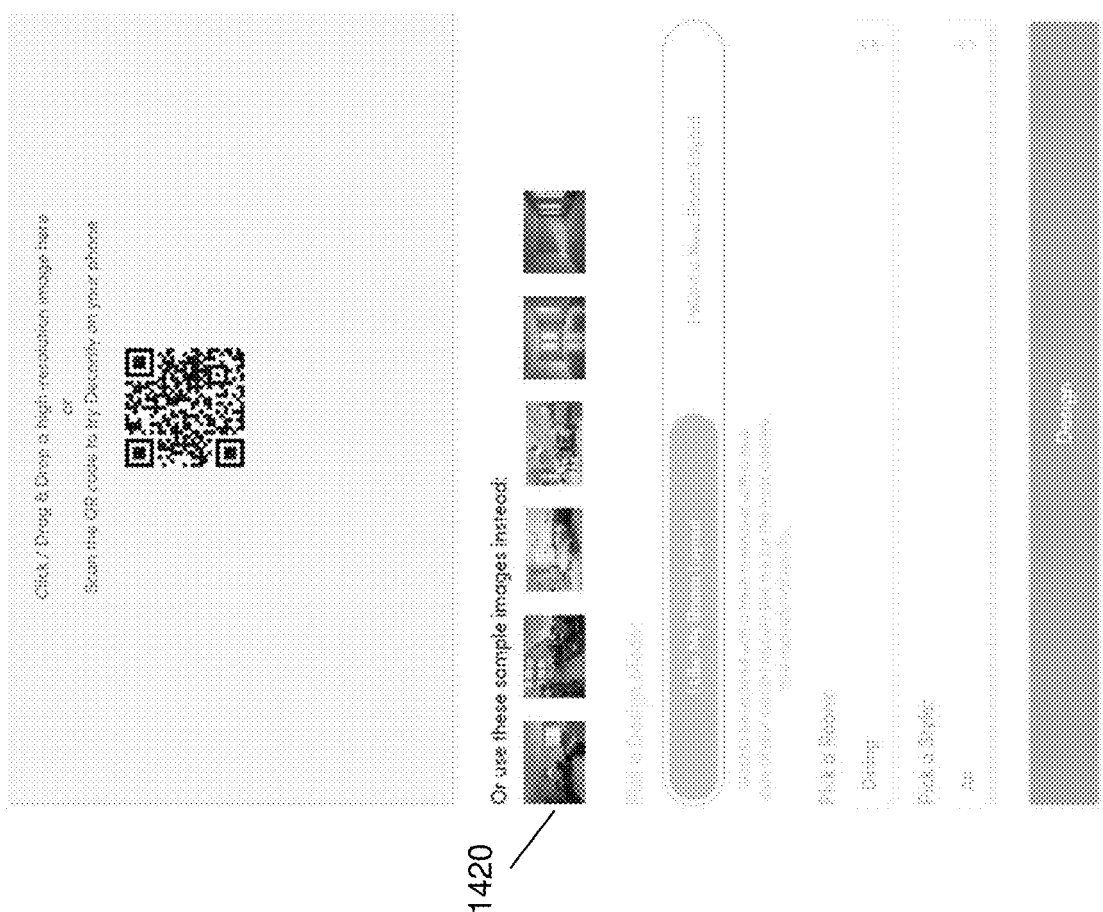
FIGS. 14A-14B are screenshots of example user interfaces through which the user may provide an image of a space and information indicating a design mode and target style for the space, according to some embodiments of the technology described herein.
Figure 14B:
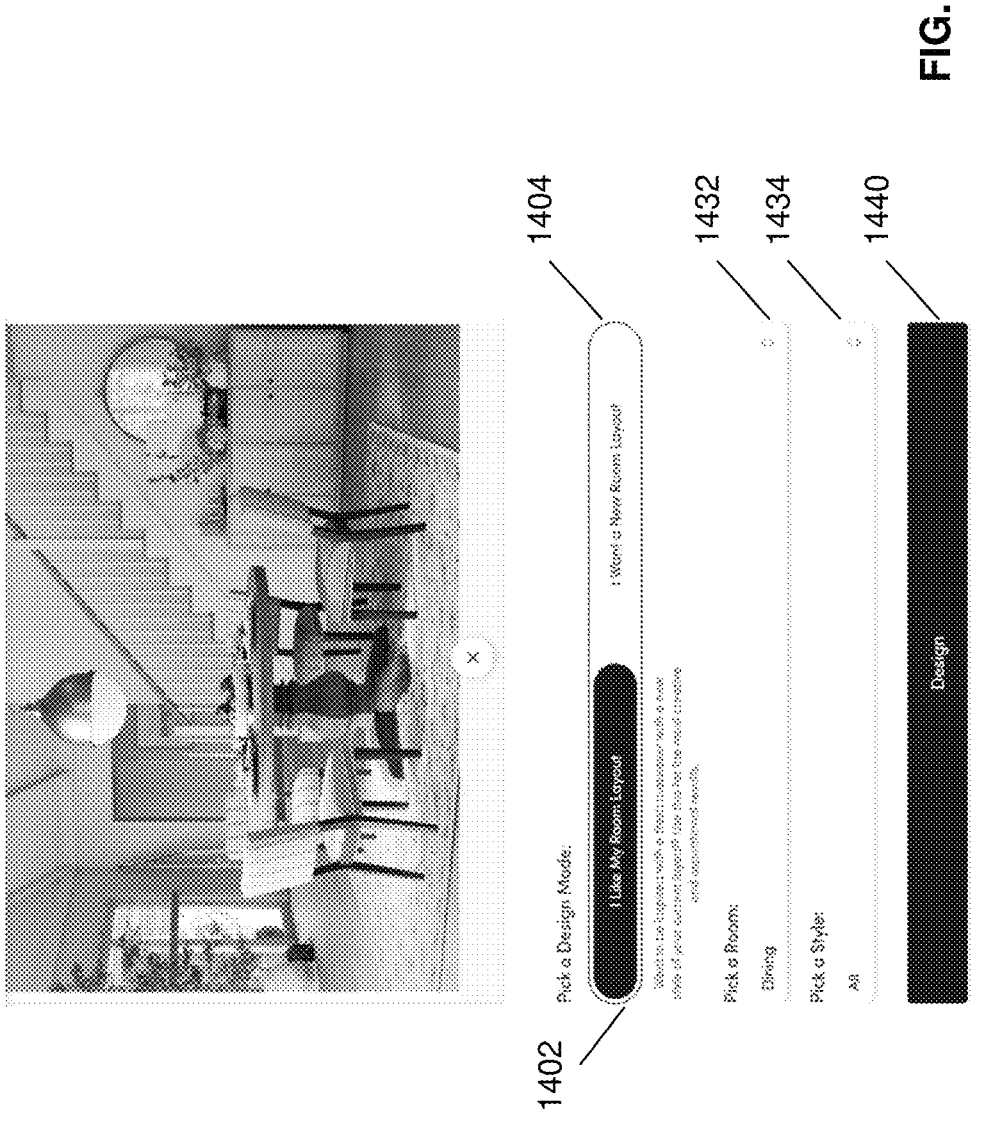
Figure 14E:
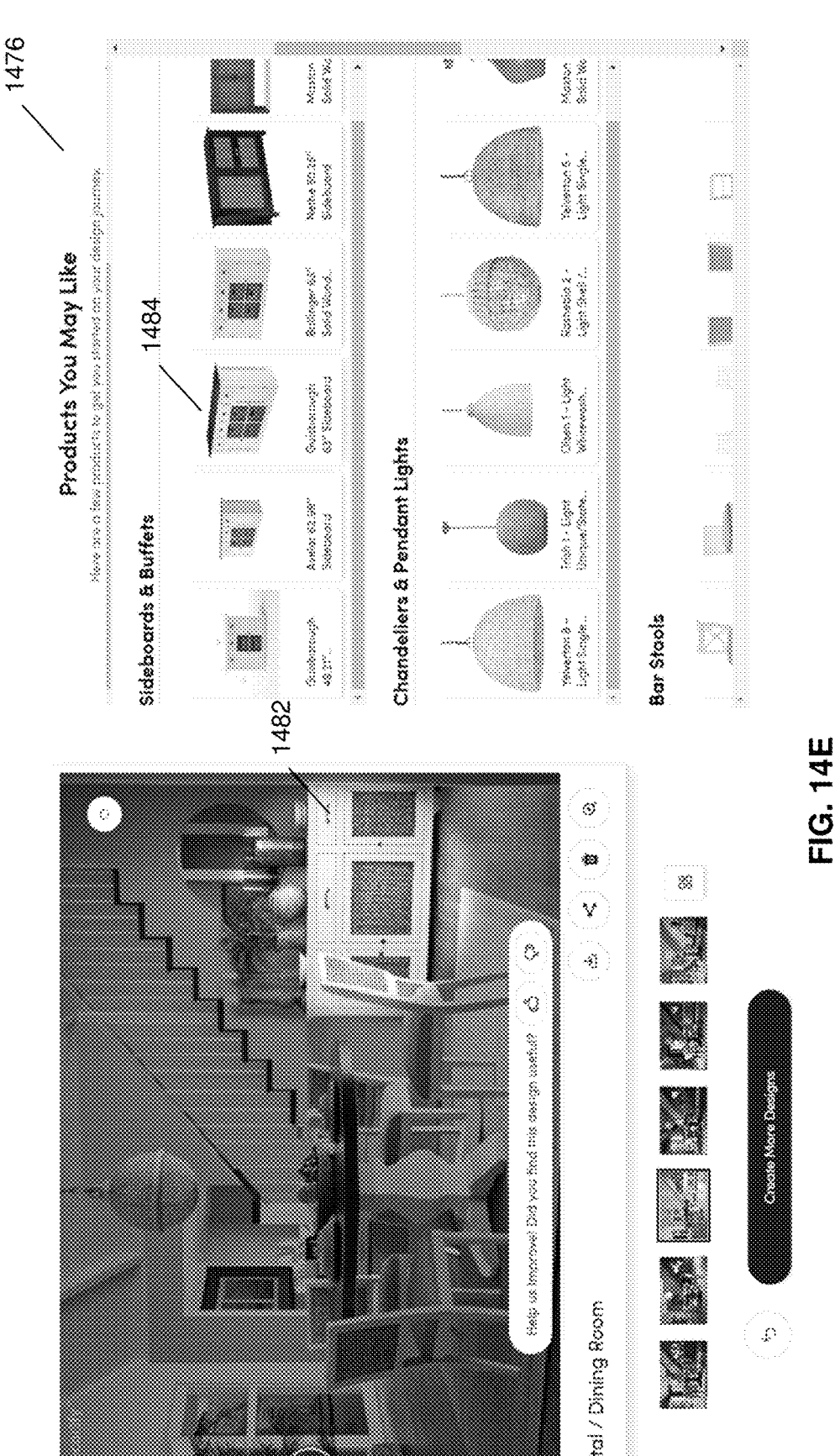

In some embodiments, multiple generated images (i.e., design options) for the same style may be presented to the user at the same time. For example, two, three, four, or any other suitable number of images may be generated for the target style and presented to the user. In some embodiments, multiple generated images for different styles may be presented to the user at the same time. For example, a user may select one of the existing sample images 1420 as shown in FIG. 14A. The user may indicate a "design mode" for the image generation process as shown in FIG. 14B, where the user may select a GUI element 1402 or 1404 to indicate whether to generate image(s) while retaining the layout of the space in the selected sample image or generate image(s) with new/different layouts of the space. The user may specify a space type via GUI element 1432 (for example, dining room, etc.) and a target style for the space via GUI element 1434 (e.g., mid-century modern, contemporary, etc.). The target style selection may include an "All" option, which causes multiple images to be generated, one for each style supported by the system. Selection of the "Design"

button 1440 may cause the client device 102 to communicate the image of the space, the design mode, the space type, and target style information to the server 110. The generative ML model may generate multiple images of the space in different target styles. For example, FIG. 14C shows six images 1462, 1464, 1466, 1468, 1470, 1472 generated by the generative ML model. The user may select image 1466 and a list of products 1476 offered by the online retailer that are similar to one or more furnishings (e.g., chairs, mirrors, lights, etc.) included in the image 1466 output by the generative ML model may be generated and presented. In some embodiments, hovering a cursor over a particular product or product category in the list 1476 may cause the corresponding furnishing in the generated image to be highlighted. For example, FIG. 14E shows furnishing 1482 being highlighted when hovering a cursor over product 1484 in the product list 1576. Similarly, FIG. 14F shows furnishing 1492 being highlighted when hovering a cursor over product 1494 in the product list 1476.

Figure 15A:
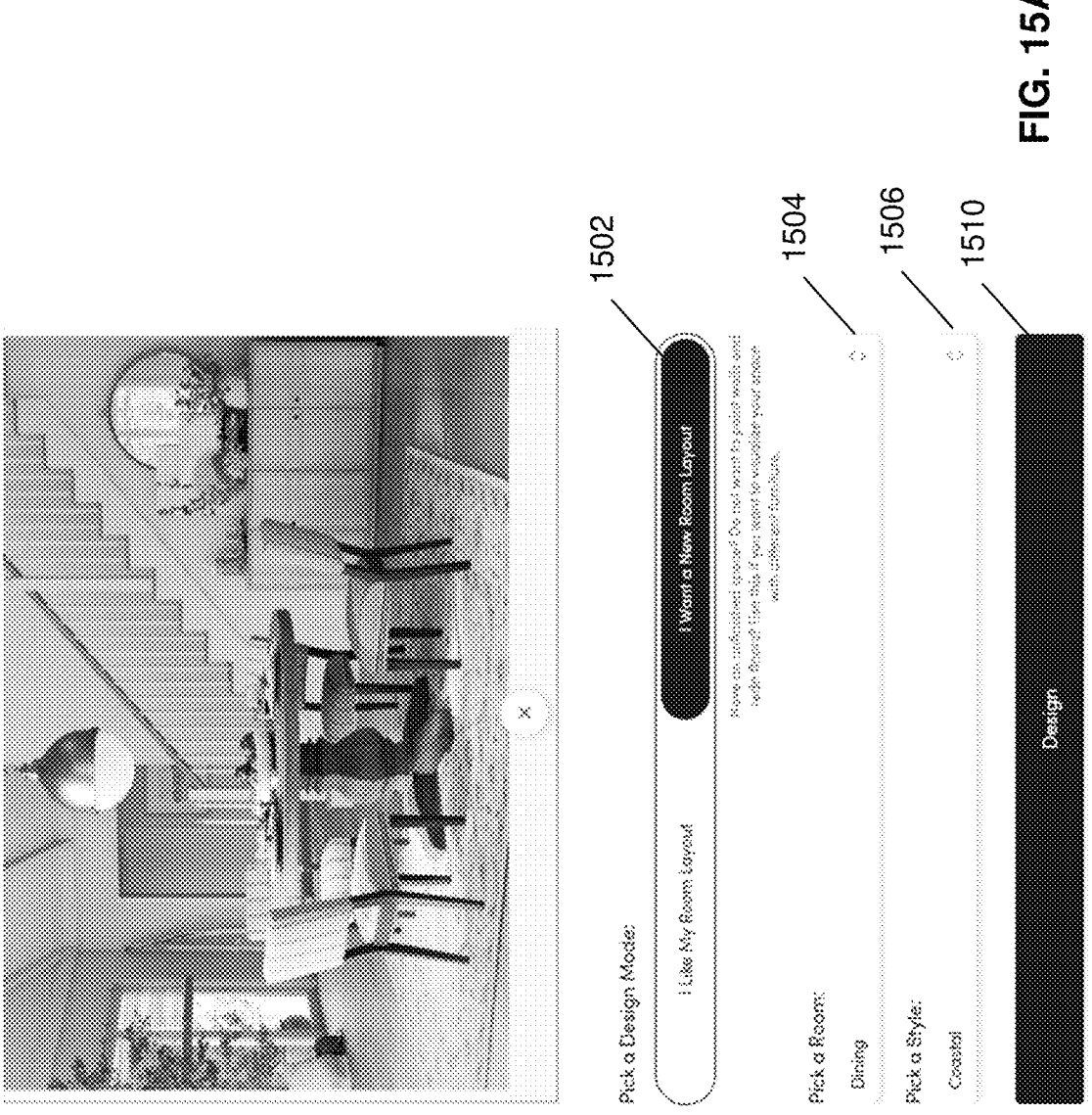
FIG. 15A is a screenshot of an example user interface through which the user may provide an image of a space and information indicating a design mode and target style for the space, according to some embodiments of the technology described herein.
Figure 16:
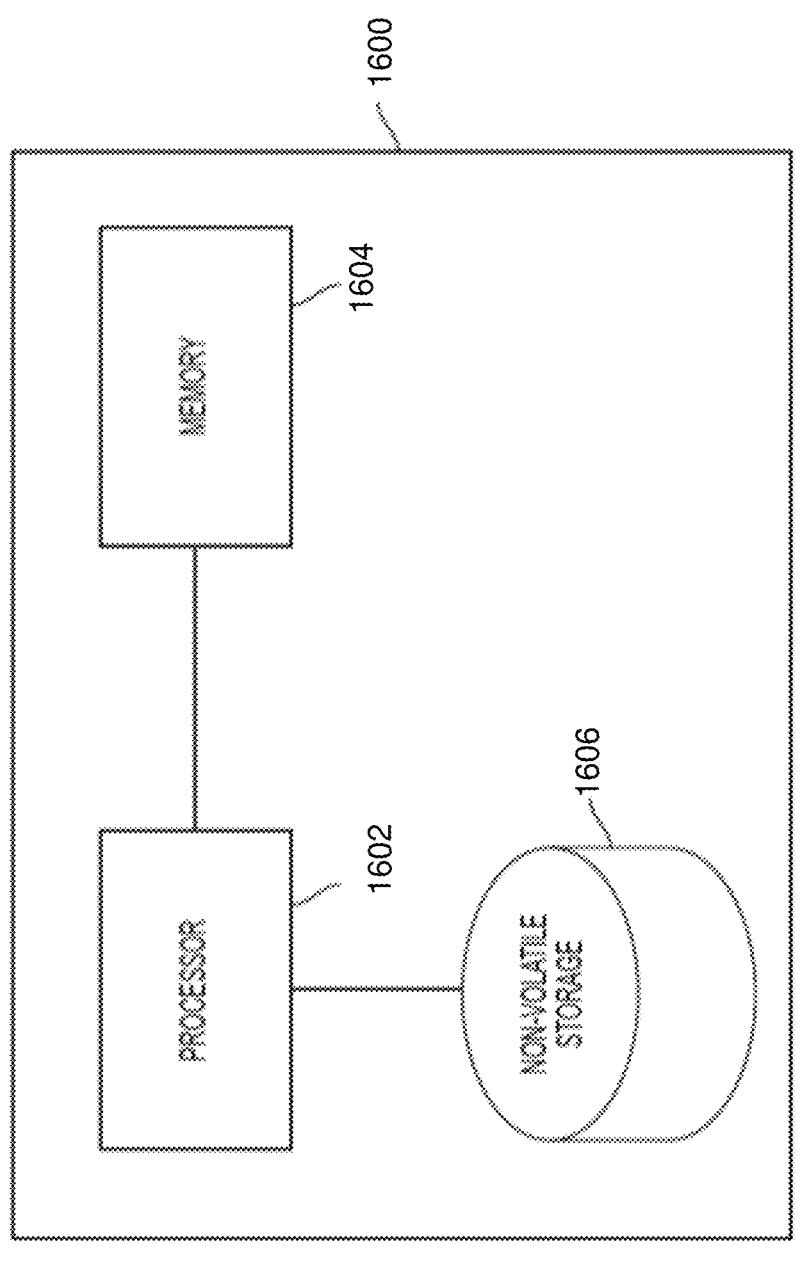
FIG. 16 is a block diagram of an example computer system, according to some embodiments of the technology described herein.

In some embodiments, the layout of the space may be changed along with the furnishings in the generated image. For example, as shown in FIGS. 15A-15B, the user may select GUI element 1502 for a "design mode" indicating generation of image(s) with new/different layouts of the space. The user may specify a space type via GUI element 1504 (for example, dining room, etc.) and a target style for the space via GUI element 1506 (e.g., Coastal, etc.). Selection of the "Design" button 1510 may cause the client device 102 to communicate the image of the space, the design mode, the space type, and target style information to the server 110. The generative ML model may generate multiple images of the space in different layouts for the selected target style. For example, FIG. 15B shows six images 1522, 1524, 1526, 1528, 1530, 1532 generated by the generative ML model.

In some embodiments, new layout(s) of the space may be generated while retaining the space's architectural details (e.g., walls, floors, doors, windows, and/or other architectural details). For example, FIG. 12A shows an image of the space provided by a user (e.g., an image uploaded by the user via GUI 400). FIGS. 12B-12J show examples of different generated images of the space in different target styles, where the location of the sliding door is retained in each of the generated images. In some embodiments, the system may automatically detect one or more architectural details, such as, windows and doors, in the sample image or the user provided image. In these embodiments, the system may detect the architectural detail(s) and generate a mask to be provided as input to the generative ML model. The generative ML model may utilize the mask to generate images of the space in different target styles while keeping the architectural detail(s) in place.

In some embodiments, the object detection module 114 may detect one or more architectural details in the sample image or the user provided image. The object detection module 114 may also classify the detected architectural details into categories or types of architectural details (e.g., door, window, wall, etc.). In some embodiments, the object detection module 114 may detect the one or more architectural details using a trained neural network model trained to perform object detection to obtain at least one portion in the sample/user provided image containing the detected architectural details and at least one corresponding label indicating a type (e.g., wall, floor, window, door, etc.) for the architectural detail detected.

In some embodiments, one or more surfaces, such as floors and walls, may be detected in the sample/user provided image at least in part by identifying a surface plane from the image and determining, for each pixel of a number of pixels corresponding to the surface plane, whether the pixel corresponds to at least a portion of the surface in the image. For example, an image of the space may be processed to identify one or more floor planes in the user's environment as the image is being captured. The captured image may be processed to determine, for at least some pixels in the image, whether the pixel corresponds to floor or not-floor, and the output of the process may be mask information. In some embodiments, at least some of the pixels in the image are classified as floor/not floor using a classifier, where the mask information is generated based on the output of the classifier. In some embodiments the classifier is configured to implement a machine learning approach by using one or more trained statistical networks (e.g., one or more trained neural networks) to assign individual pixels in an image to a particular class (e.g., floor/not-floor) mask information. The mask information may include a classification for each pixel in the captured image. Alternatively, the mask information may include a classification only for a subset of pixels in the captured image corresponding, for example, to some or all of the pixels along the identified floor plane in the image. Identification of and image processing associated with surface planes is described in U.S. Pat. No. 11,770,496 entitled "Systems and Methods for Visualizing Surface Covering in an Image of a Scene," the entire contents of which are incorporated by reference herein.

In some embodiments, a mask may be generated based on the detected architectural details. The mask may include a black and white image where the portion of the image including the architectural details to be retained in black and the rest of the image is white. In some embodiments, the generative ML model utilizes the mask to generate an image of the space in which the portion of the image that does not include the architectural details is redesigned in a particular target style while keeping the architectural details in place.

The following is a list of steps that may be followed by the user for the redesign process.

(1) Upload an image of space; Pick a room type; Pick a style you want to style the room to; Click "Design.

(2) Within 8-10 s, the user is presented with images generated by the generative ML model, which may be a redesigned version of their room in the selected style.

(3) "Shop Similar Look" by browsing the identified furnishing products displayed next to the resulting image.

(4) If the user wants to see a different style or different design for the same style, click "Re-Design".

(5) Every time the redesign process is run, a completely different image with new product suggestions is shown.

(6) The design output can be shared by clicking on the "Share" button and copy pasting the link (7) All the generated designs can be seen in the "My Designs" section of the user interface.

The following is a list of steps that may be followed by the user for the replace process.

(1) Upload an image of your space; Tap the pencil icon to switch to "Replace an item" mode (the pencil will turn purple; tap the pencil again to turn it off); Pick an item to replace and color over it.

(2) In the "Replace with" drop down select an item; Click "Design".

(3) Within 8-10 s, the user is presented with a modified image of the room generated by the generative ML model, which may be a version of their room with the colored-in item replaced with the item selected from the dropdown.

(4) Every time the replace process is run, a different item is shown in the location of the colored-in item.

(5) Any output image may be saved and uploaded again to change items.

FIG. 14 shows a block diagram of an example computer system 1400 that may be used to implement embodiments of the technology described herein. The computing device 1400 may include one or more computer hardware processors 1402 and non-transitory computer-readable storage media (e.g., memory 1404 and one or more non-volatile storage devices 1406). The processor(s) 1402 may control writing data to and reading data from (1) the memory 1404; and (2) the non-volatile storage device(s) 1406. To perform any of the functionality described herein, the processor(s) 1402 may execute one or more processor-executable instructions stored in one or more non-transitory computer-readable storage media (e.g., the memory 1404), which may serve as non-transitory computer-readable storage media storing processor-executable instructions for execution by the processor(s) 1402.

The computer system 1400 may be a portable computing device (e.g., a smartphone, a tablet computer, a laptop, or any other mobile device), a computer (e.g., a desktop, a rack-mounted computer, a server, etc.), or any other type of computing device.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform tasks or implement abstract data types. Typically, the functionality of the program modules may be combined or distributed.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for using a generative machine learning (ML) model to generate one or more images of a space in one or more target styles, the method comprising:

using at least one computer hardware processor to perform:

receiving, from a client device, an image of the space, and information indicating a target style for the space;

generating, from the information indicating the target style for the space, a textual prompt for use in prompting the generative ML model to generate one or more images of the space in the target style, wherein the textual prompt comprises a plurality of keywords indicating image characteristics to attempt to have in the to-be-generated one or more images of the space in the target style and to attempt to exclude in the to-be-generated one or more images of the space in the target style;

processing the image of the space and the textual prompt by using the generative ML model to obtain at least one generated image of the space in the target style;

detecting at least one furnishing in the at least one generated image;

identifying, in a catalog of furnishing products, one or more furnishing products similar to the at least one furnishing detected in the at least one generated image, the identifying comprising:

obtaining at least one portion of the at least one generated image containing the detected at least one furnishing; and searching, using the at least one portion and among a set of images of furnishing products in the catalog, for one or more images of furnishing products similar to the detected at least one furnishing; and sending, to the client device, information about the one or more furnishing products identified in the catalog of furnishing products.

2. The method of claim 1, wherein the image of the space is an image of a room.

3. The method of claim 1, further comprising:

providing a graphical user interface (GUI) through which a user can provide the image of the space and the information indicating the target style for the space; and receiving, via the GUI, the image of the space and the information indicating the target style for the space.

4. The method of claim 1, wherein the target style is selected from the group of styles consisting of: mid-century modern, coastal, modern farmhouse, Bohemian, industrial, glam and Scandinavian.

5. The method of claim 1, wherein the generative ML model comprises a latent diffusion model.

6. The method of claim 5, wherein the latent diffusion model is configured to perform text-prompt-guided image-to-image translation.

7. The method of claim 5, wherein the latent diffusion model comprises a Stable Diffusion model.

8. The method of claim 5, wherein the generative ML model further comprises a second trained ML model configured to pre-process the image of the space, wherein processing the image of the space and the textual prompt using the generative ML model, comprises:

processing the image of the space using the second trained ML model to obtain a pre-processed image of the space; and processing the pre-processed image of the space and the textual prompt using the latent diffusion model.

9. The method of claim 8, wherein the second trained ML model is trained to control the latent diffusion model with task-specific conditions.

10. The method of claim 8, wherein the second trained ML model is a trained neural network model configured to detected edges, lines, and/or key points in the image of the space.

11. The method of claim 8, wherein the second trained ML model is a ControlNet model.

12. The method of claim 1, wherein detecting the at least one furnishing in the at least one generated image comprises:

detecting the at least one furnishing using a trained neural network model trained to perform object detection to obtain at least one portion in the at least one generated image containing the detected at least one furnishing and at least one corresponding label indicating a type for any furnishing so detected.

13. The method of claim 1, wherein each particular portion of the at least one portion is a bounding box containing the corresponding furnishing detected in the particular portion.

14. The method of claim 1, wherein the searching comprises using a visual search technique to identify, in a first database storing the set of images of furnishing products in the catalog, the one or more images of furnishing products and corresponding one or more identifiers of the furnishing products.

15. The method of claim 14, further comprising:
accessing, using the one or more identifiers of the furnishing products and in a second database separate from the first database, the information about the one or more furnishing products.

16. The method of claim 1, wherein
sending the information about the one or more furnishing products identified in the catalog of furnishing products comprises:
providing the client device with images of the identified furnishing products and information to facilitate purchase of the identified furnishing products.

17. A system, comprising:
at least one computer hardware processor;
at least one non-transitory computer readable storage medium storing processor-executable instructions that, when executed by the at least one computer hardware processor, cause the at least one computer hardware processor to perform a method comprising:
receiving, from a client device,
an image of a space, and
information indicating a target style for the space;
generating, from the information indicating the target style for the space, a textual prompt for use in prompting a generative maching learning (ML) model to generate one or more images of the space in the target style, wherein the textual prompt comprises a plurality of keywords indicating image characteristics to attempt to have in the to-be-generated one or more images of the space in the target style and to attempt to exclude in the to-be-generated one or more images of the space in the target style;
processing the image of the space and the textual prompt by using the generative ML model to obtain at least one generated image of the space in the target style;
detecting at least one furnishing in the at least one generated image;
identifying, in a catalog of furnishing products, one or more furnishing products similar to the at least one furnishing detected in the at least one generated image, the identifying comprising:
obtaining at least one portion of the at least one generated image containing the detected at least one furnishing; and
searching, using the at least one portion and among a set of images of furnishing products in the catalog, for one or more images of furnishing products similar to the detected at least one furnishing; and
sending, to the client device, information about the one or more furnishing products identified in the catalog of furnishing products.

18. At least one non-transitory computer readable storage medium storing processor-executable instructions that, when executed by at least one computer hardware processor, cause the at least one computer hardware processor to perform a method comprising:
receiving, from a client device,
an image of a space, and
information indicating a target style for the space;
generating, from the information indicating the target style for the space, a textual prompt for use in prompting a generative maching learning (ML) model to generate one or more images of the space in the target style, wherein the textual prompt comprises a plurality of keywords indicating image characteristics to attempt to have in the to-be-generated one or more images of the space in the target style and to attempt to exclude in the to-be-generated one or more images of the space in the target style;
processing the image of the space and the textual prompt by using the generative ML model to obtain at least one generated image of the space in the target style;
detecting at least one furnishing in the at least one generated image;
identifying, in a catalog of furnishing products, one or more furnishing products similar to the at least one furnishing detected in the at least one generated image, the identifying comprising:
obtaining at least one portion of the at least one generated image containing the detected at least one furnishing; and
searching, using the at least one portion and among a set of images of furnishing products in the catalog, for one or more images of furnishing products similar to the detected at least one furnishing; and
sending, to the client device, information about the one or more furnishing products identified in the catalog of furnishing products.

19. A method for using a generative machine learning (ML) model to generate one or more images of a space in one or more target styles, the method comprising:
using at least one computer hardware processor to perform:
receiving, from a client device,
an image of the space, and
information indicating multiple target styles for the space, including a target style for the space;
generating, from the information indicating the multiple target styles for the space, a respective textual prompt for each of the multiple target styles to obtain multiple textual prompts, including a textual prompt for use in prompting the generative ML model to generate one or more images of the space in the target style;
processing the image of the space and the multiple textual prompts by using the generative ML model to obtain generated images of the space in each of the multiple target styles, the processing comprising processing the image of the space and the textual prompt by using the generative ML model to obtain at least one generated image of the space in the target style;
detecting at least one furnishing in the at least one generated image;
identifying, in a catalog of furnishing products, one or more furnishing products similar to the at least one furnishing detected in the at least one generated image, the identifying comprising:

obtaining at least one portion of the at least one generated image containing the detected at least one furnishing; and searching, using the at least one portion and among a set of images of furnishing products in the catalog, for one or more images of furnishing products similar to the detected at least one furnishing; and sending, to the client device, information about the one or more furnishing products identified in the catalog of furnishing products.

20. A system, comprising:

at least one computer hardware processor;

at least one non-transitory computer readable storage medium storing processor-executable instructions that, when executed by the at least one computer hardware processor, cause the at least one computer hardware processor to perform a method comprising:

receiving, from a client device, an image of a space, and information indicating multiple target styles for the space, including a target style for the space;

generating, from the information indicating the multiple target styles for the space, a respective textual prompt for each of the multiple target styles to obtain multiple textual prompts, including a textual prompt for use in prompting a generative maching learning (ML) model to generate one or more images of the space in the target style;

processing the image of the space and the multiple textual prompts by using the generative ML model to obtain generated images of the space in each of the multiple target styles, the processing comprising processing the image of the space and the textual prompt by using the generative ML model to obtain at least one generated image of the space in the target style;

detecting at least one furnishing in the at least one generated image;

identifying, in a catalog of furnishing products, one or more furnishing products similar to the at least one furnishing detected in the at least one generated image, the identifying comprising:

obtaining at least one portion of the at least one generated image containing the detected at least one furnishing; and searching, using the at least one portion and among a set of images of furnishing products in the catalog, for one or more images of furnishing products similar to the detected at least one furnishing; and sending, to the client device, information about the one or more furnishing products identified in the catalog of furnishing products.

21. At least one non-transitory computer readable storage medium storing processor-executable instructions that, when executed by at least one computer hardware processor, cause the at least one computer hardware processor to perform a method comprising:

receiving, from a client device, an image of a space, and information indicating multiple target styles for the space, including a target style for the space;

generating, from the information indicating the multiple target styles for the space, a respective textual prompt for each of the multiple target styles to obtain multiple textual prompts, including a textual prompt for use in prompting a generative maching learning (ML) model to generate one or more images of the space in the target style;

processing the image of the space and the multiple textual prompts by using the generative ML model to obtain generated images of the space in each of the multiple target styles, the processing comprising processing the image of the space and the textual prompt by using the generative ML model to obtain at least one generated image of the space in the target style;

detecting at least one furnishing in the at least one generated image;

identifying, in a catalog of furnishing products, one or more furnishing products similar to the at least one furnishing detected in the at least one generated image, the identifying comprising:

obtaining at least one portion of the at least one generated image containing the detected at least one furnishing; and searching, using the at least one portion and among a set of images of furnishing products in the catalog, for one or more images of furnishing products similar to the detected at least one furnishing; and sending, to the client device, information about the one or more furnishing products identified in the catalog of furnishing products.

22. A method for using a generative machine learning (ML) model to generate one or more images of a space in one or more target styles, the method comprising:

using at least one computer hardware processor to perform:

receiving, from a client device, an image of the space, and information indicating a target style for the space;

generating, from the information indicating the target style for the space, a textual prompt for use in prompting the generative ML model to generate one or more images of the space in the target style, wherein the generative ML model comprises a latent diffusion model and a second trained ML model configured to pre-process the image of the space;

processing the image of the space and the textual prompt by using the generative ML model to obtain at least one generated image of the space in the target style, wherein processing the image of the space and the textual prompt using the generative ML model, comprises:

processing the image of the space using the second trained ML model to obtain a pre-processed image of the space; and processing the pre-processed image of the space and the textual prompt using the latent diffusion model;

detecting at least one furnishing in the at least one generated image;

identifying, in a catalog of furnishing products, one or more furnishing products similar to the at least one furnishing detected in the at least one generated image, the identifying comprising:

obtaining at least one portion of the at least one generated image containing the detected at least one furnishing; and searching, using the at least one portion and among a set of images of furnishing products in the catalog, for one or more images of furnishing products similar to the detected at least one furnishing; and sending, to the client device, information about the one or more furnishing products identified in the catalog of furnishing products.

* * * * *